United States Patent
Koga

(10) Patent No.: US 10,656,587 B2
(45) Date of Patent: May 19, 2020

(54) SHEET CONVEYING DEVICE AND IMAGE FORMING APPARATUS

(71) Applicant: CANON KABUSHIKI KAISHA, Tokyo (JP)

(72) Inventor: Satoshi Koga, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/132,753

(22) Filed: Sep. 17, 2018

(65) Prior Publication Data
US 2019/0094783 A1 Mar. 28, 2019

(30) Foreign Application Priority Data

Sep. 25, 2017 (JP) .................................. 2017-183520
Sep. 27, 2017 (JP) .................................. 2017-187126

(51) Int. Cl.
*B65H 3/06* (2006.01)
*G03G 15/00* (2006.01)
*B65G 47/88* (2006.01)

(52) U.S. Cl.
CPC ...... *G03G 15/6529* (2013.01); *B65G 47/8853* (2013.01); *B65H 3/0669* (2013.01); *B65H 3/0684* (2013.01); *G03G 15/605* (2013.01); *G03G 15/6511* (2013.01); *B65H 3/0638* (2013.01); *B65H 2402/60* (2013.01); *B65H 2403/721* (2013.01); *B65H 2403/73* (2013.01);
(Continued)

(58) Field of Classification Search
CPC .. B65H 3/0638; B65H 3/0669; B65H 3/0684; B65H 2601/324; B65H 2402/60; B65H 2403/73
See application file for complete search history.

(56) References Cited

U.S. PATENT DOCUMENTS 5,040,779 A * 8/1991 Ogiri .................... B65H 3/0669
  198/789
6,059,280 A * 5/2000 Yamauchi ............ B65H 3/5261
  193/35 R
(Continued)

FOREIGN PATENT DOCUMENTS

JP 2008222317 A 9/2008
JP 2010250219 A 11/2010
(Continued)

*Primary Examiner* — Howard J Sanders
(74) *Attorney, Agent, or Firm* — Canon U.S.A., Inc. IP Division

(57) ABSTRACT

A sheet conveying device includes a supporting shaft, a rotating unit removable from an installation portion, a movable shaft, and an interlocking device. The rotating unit includes first and second ends, a holding member that holds a rotating body that conveys a sheet. The supporting shaft supports the rotating unit at the first end in an axial direction of the rotating body. The movable shaft is movable in the axial direction and supports the second end. The interlocking device moves the movable shaft per the rotating unit movement. Where the rotating unit is to be moved at a moving amount towards a side in which the rotating unit separates from the supporting shaft as part of removing the rotating unit from the installation portion, the interlocking device moves the movable shaft in the axial direction at a moving amount that is larger than the moving amount the rotating unit.

21 Claims, 17 Drawing Sheets

(52) U.S. Cl.
CPC .... *B65H 2404/17* (2013.01); *B65H 2601/324* (2013.01); *B65H 2801/06* (2013.01)

(56) References Cited

U.S. PATENT DOCUMENTS

| | | | | |
|---|---|---|---|---|
| 6,530,706 | B2* | 3/2003 | Sugimoto | B65H 3/0623 271/10.09 |
| 7,497,434 | B2* | 3/2009 | Park | B65H 1/14 271/126 |
| 7,731,174 | B2* | 6/2010 | Lee | B65H 3/0638 271/109 |
| 7,845,634 | B2* | 12/2010 | Asakawa | B65H 29/22 271/200 |
| 8,585,039 | B2* | 11/2013 | Murata | B65H 1/266 271/109 |
| 8,894,061 | B2* | 11/2014 | Matsuoka | B65H 5/06 271/10.13 |
| 9,272,858 | B2* | 3/2016 | Hirose | B65H 3/0669 |
| 9,880,505 | B2* | 1/2018 | Matsumoto | B65H 29/22 |
| 10,106,348 | B2* | 10/2018 | Tomoe | G03G 15/6502 |
| 10,435,258 | B2* | 10/2019 | Aono | B65H 3/5261 |
| 10,486,922 | B2* | 11/2019 | Horita | B65H 3/0638 |
| 2009/0267293 | A1* | 10/2009 | Watanabe | B65H 3/0638 271/264 |
| 2015/0344245 | A1* | 12/2015 | Matsuo | B65H 1/266 271/264 |

FOREIGN PATENT DOCUMENTS

| | | | |
|---|---|---|---|
| JP | 2012218865 A | 11/2012 | |
| JP | 2013112460 A | 6/2013 | |
| JP | 2014114083 A | 6/2014 | |

* cited by examiner

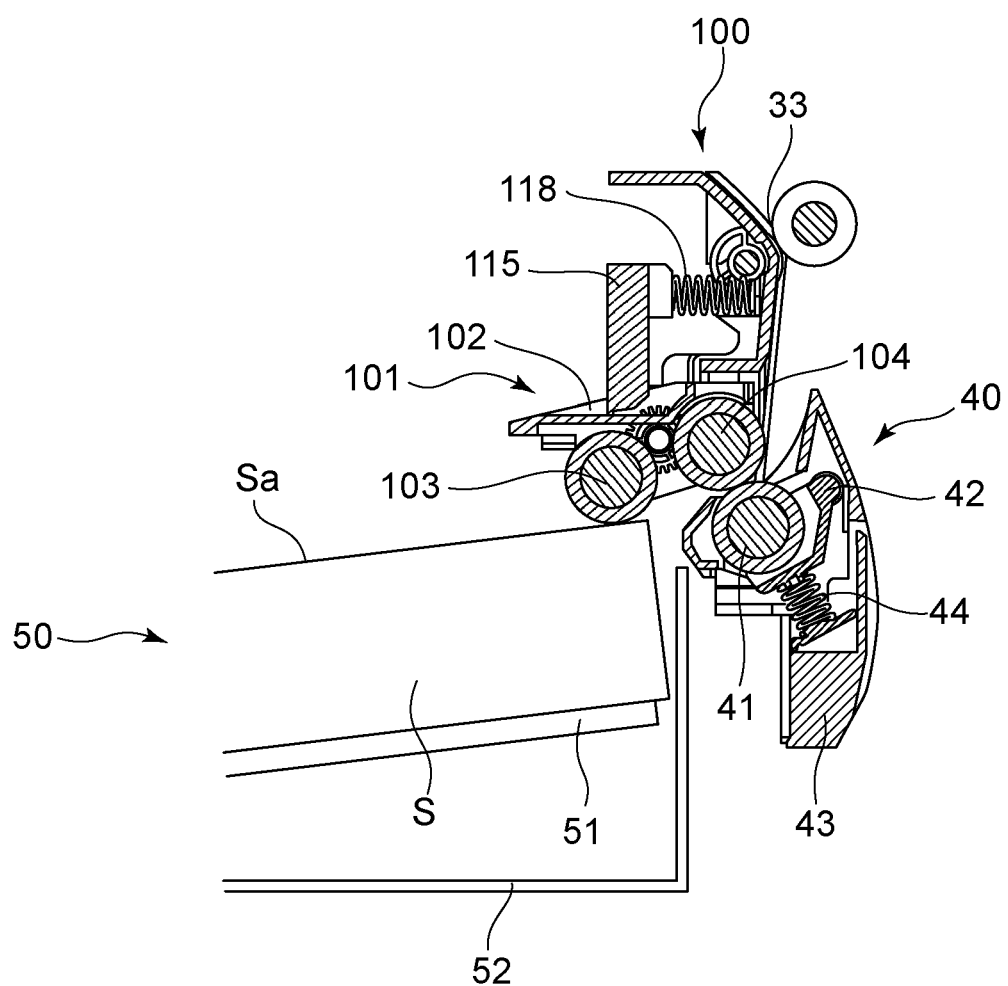

FIG. 6A
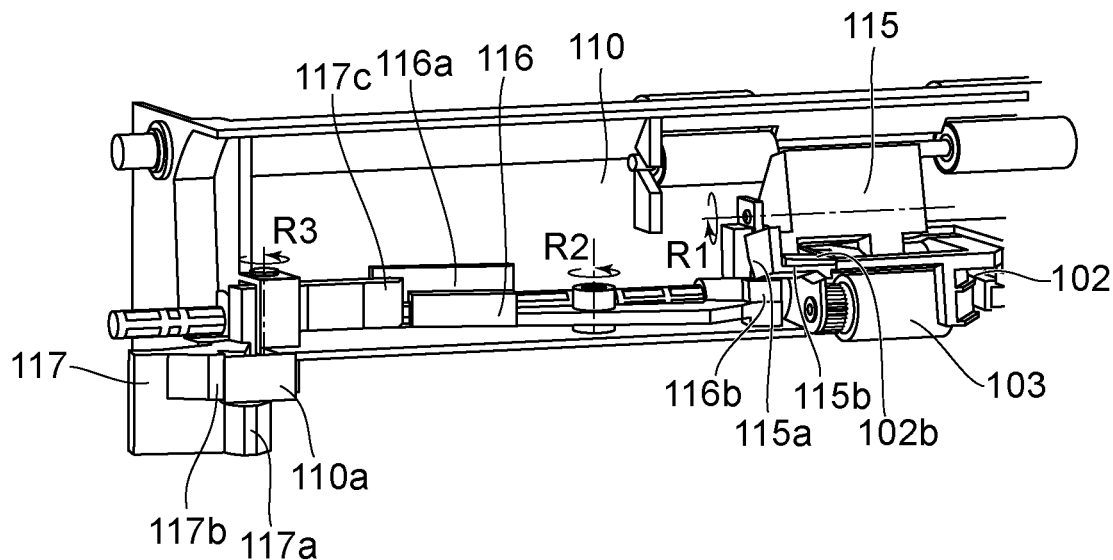
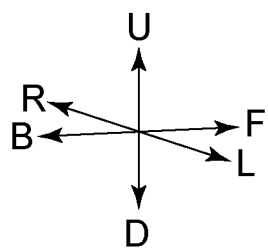
FIG. 6B
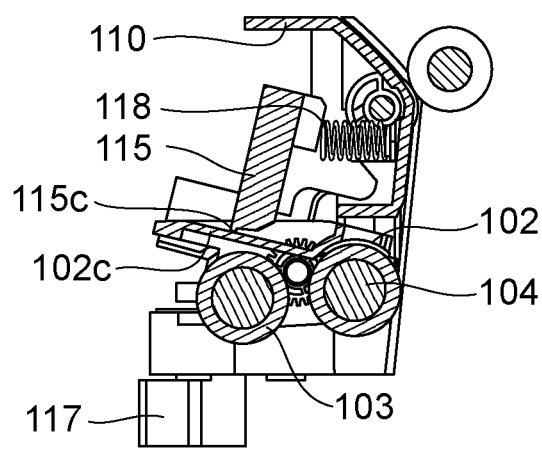

SHEET CONVEYING DEVICE AND IMAGE FORMING APPARATUS

BACKGROUND

Field of the Disclosure

The present disclosure relates to a sheet conveying device and an image forming apparatus.

Description of the Related Art

Image forming apparatuses, such as electrophotographic image forming apparatuses, having a structure in which a sheet is conveyed to an image forming section and an image is formed on the sheet have been in widespread use. In addition, such image forming apparatuses generally-include a sheet conveying device that conveys stacked sheets to the image forming section.

The sheet conveying device includes, as a rotating body, for example, a feeding roller formed from a friction member, such as a rubber member. When sheets are to be fed, the feeding roller abuts on the stacked sheets, and rotates to feed the sheets to the image forming section.

When, in the sheet conveying device having such a structure, the rubber of the feeding roller is deteriorated due to, for example, wear, a reduction in feeding performance may occur. Therefore, a sheet conveying device having a structure in which the roller is replaceable by a user or a serviceman is proposed in Japanese Patent Laid-Open Nos. 2013-112460 and 2008-222317, Japanese Patent Laid-Open Nos. 2013-112460 and 2008-222317 both describe a structure including a roller (or a roller unit in which the roller and a holding member are unitized), a supporting shaft that is provided coaxially with the roller and that supports an end of the roller, and a movable shaft that supports the other end side of the roller and that is movable in an axial direction of the roller.

In Japanese Patent Laid-Open No. 2013-112460, when the roller unit is moved in a direction of separation from the supporting shaft (axial direction) and the supporting shaft and the roller unit are disconnected from each other, the roller unit is tiltable (the roller and the supporting shaft are brought into a state having non-identical axes). The roller unit is removed by the following procedure. The roller unit is operated, and is moved in the direction of separation from the supporting shaft. The roller unit is tilted. While the roller unit is tilted, the roller unit is moved in a direction of separation from the movable shaft. The roller unit is mounted by performing the procedure for removing the roller unit in the reverse order.

In Japanese Patent Laid-Open No. 2008-222317, the movable shaft is movable to a first position, where the movable shaft is connected to the shaft, and to a second position, where the movable shaft is disconnected from the roller; and includes an engaging mechanism that holds the movable shaft at the second position. The roller is removed by the following procedure. After operating the movable shaft and moving the movable shaft to the second position, the movable shaft is held by the engaging mechanism. After operating the roller and moving the roller in a direction of separation from the supporting shaft, the roller is removed. The roller is mounted by performing the above-described procedure in the reverse order.

SUMMARY OF THE INVENTION

The present disclosure provides a sheet conveying device and an image forming apparatus in which usability regarding removal of a roller is further increased.

According to an aspect of the present invention, a sheet conveying device to convey a sheet includes an installation portion, a supporting member, a rotating unit configured to be removable from the installation portion and having a first end side, a second end side, a holding member, and a rotating body held by the holding member and configured to convey the sheet by contacting the sheet and rotating, wherein the rotating unit is supported by the supporting member at the first end side in an axial direction of the rotating body, a movable shaft configured to be movable in the axial direction of the rotating body, wherein the movable shaft supports the second end side of the rotating body unit in the axial direction of the rotating body, and an interlocking device configured to move the movable shaft in accordance with movement of the rotating unit in the axial direction of the rotating body, wherein, in a case where the rotating unit is to be moved at a moving amount towards a side in which the rotating unit separates from the supporting member as part of removing the rotating unit from the installation portion, the interlocking device moves the movable shaft in the axial direction at a moving amount that is larger than the moving amount of the rotating unit in the axial direction.

Further features of the present disclosure will become apparent from the following description of embodiments with reference to the attached drawings.

BRIEF DESCRIPTION OF THE DRAWINGS

FIG. 2 is a sectional view schematically showing a structure of a sheet conveying device according to the first embodiment.

FIGS. 6A and 6B each show the feeding unit with a feeding cassette of the feeding unit according to the first embodiment removed, with FIG. 6A being a perspective view thereof and FIG. 6B being a sectional view thereof.

DESCRIPTION OF THE EMBODIMENTS

First Embodiment

A first embodiment s described in detail below with reference to FIGS. 1 to 14C.

Figure 1:
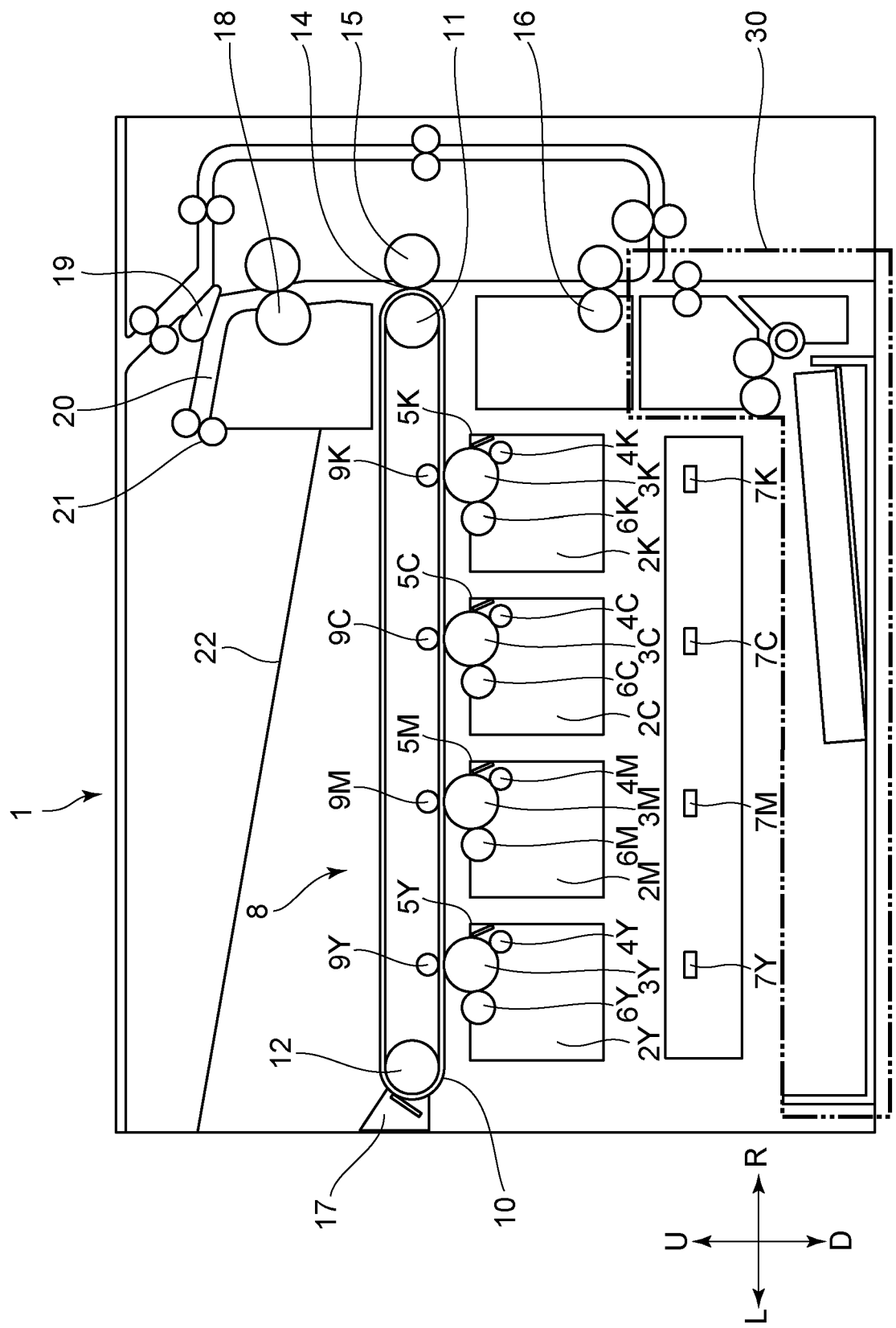
FIG. 1 is a sectional view schematically showing a structure of an image forming apparatus according to a first embodiment.

FIG. 1 is a sectional view showing a structure of a color electrophotographic image forming apparatus. However, the present disclosure is not limited to an image forming apparatus 1 using an electrophotographic process, and may be applied to image forming apparatuses of other types. For example, the image forming apparatus may be a printer using an inkjet image forming process.

As shown in each figure, a near side (front side) of the image forming apparatus 1 is defined as a forward direction F, and a far side (hack side) of the image forming apparatus 1 is defined as a backward direction B. Moreover, the left side of the image forming apparatus 1 is defined as a leftward direction L, the right side of the image forming apparatus 1 is defined as a rightward direction R, an upper side of the image forming apparatus 1 is defined as an upward direction U, and a lower side of the image forming apparatus 1 is defined as a downward direction D.

The image forming apparatus 1 shown in FIG. 1 includes process cartridges 2 (2Y, 2M, 2C, and 2K) that are removable from an apparatus main body. These four process cartridges 2 have the same structure, but differ in that they form images by using toners of different colors, that is, a yellow (Y) toner, a magenta (M) toner, a cyan (C) toner, or a black (K) toner. The process cartridges 2 include respective photoconductor drums 3 (3Y, 3M, 3C, and 3K), which are image carrying members; respective charging devices 4 (4Y, 4M, 4C, and 4K); respective cleaning devices 5 (5Y, 5M, 5C, and 5K); and respective developing units 6 (6Y, 6M, 6C, 6K). Laser scanner units 7 (7Y, 7M, 7C, and 7K) are disposed below the respective process cartridges. The surfaces of the photoconductor drums 3 are uniformly charged by the respective charging rollers 4. Based on image information, the laser scanner units 7 irradiate the respective photoconductor drums 3 with laser light to form electrostatic latent images. The developing devices 6 cause toners to adhere to the photoconductor drums 3 to form toner images.

An intermediate transfer belt unit 8 includes an intermediate transfer belt 10, which is a transfer belt; and a driving roller 11 and a tension roller 12, around which the intermediate transfer belt 10 is stretched. The tension roller 12 applies tension to the intermediate transfer belt 10 in the L direction. Each photoconductor drum 3 rotates clockwise in FIG. 1. The intermediate transfer belt 10 rotates counter-clockwise in FIG. 1. Primary transfer rollers 9 (9Y, 9M, 9C, and 9K) are provided on an inner side of the intermediate transfer belt 10 at positions corresponding to the respective photoconductor drums 3. The primary transfer rollers 9 each have a structure in which a transfer voltage is applied thereto by a transfer power supply (not shown).

By applying voltages to the primary transfer rollers 9, the toner images, starting with the toner image on the photoconductor drum 3Y, are successively transferred onto the intermediate transfer belt 10, and are conveyed up to a second transfer portion 14 with the toner images of the four colors superimposed on each other. Any toner that has not been transferred onto the intermediate transfer belt 10 and that has remained on the surfaces of the respective photoconductor drums 3 are removed by the respective cleaning devices 5.

The image forming apparatus includes a sheet feeding device 30, which is a sheet conveying device, for conveying sheets. After a registration roller pair 16 has adjusted the position of a leading edge of a sheet S fed from the sheet feeding device 30, the sheet S is conveyed to the second transfer portion 14. At the second transfer portion 14, by applying a transfer voltage to a second transfer roller 15 by using a second transfer power supply, the toner images of the four colors on the intermediate transfer belt 10 are transferred onto the conveyed sheet S. Any toner that has not been transferred onto the sheet S and that has remained on the surface of the intermediate transfer belt 10 is removed by a belt cleaning device 17 and is collected by a waste-toner collecting container (not shown).

The sheet S onto which the toner images have been transferred is conveyed to a fixing device 18, and is heated and pressed by the fixing device 18. This causes the toner images to be fixed to a surface of the sheet S. Thereafter, the sheet S is guided by a double-sided flapper 19, is guided to a discharge conveying path side 20, and is discharged onto a sheet discharge tray 22 via a discharge roller pair 21.

FIG. 2 is a schematic sectional view of the sheet feeding device 30. The sheet feeding device 30 sends out a sheet S to an image forming section. The sheet feeding device 30 includes a feeding unit 100 and a separation unit 40, which are mounted on the image forming apparatus (apparatus main body) 1, and a feeding cassette 50 that is removable in a front-back direction with respect to the apparatus main body 1. Further, the sheet feeding device 10 includes, for example, a feeding driving unit (not shown) for driving, for example, each roller and a lifter mechanism (described later).

The feeding unit 100 includes a roller unit (rotating-body unit) 101. The roller unit 101 includes a pickup roller 103 and a feed roller 104, which are rotating bodies. Further, the roller unit 101 includes a roller holder 102 (holding member) that holds the pickup roller 103 and the feed roller 104 parallel to each other, and is removable from the feeding unit 100. A detailed structure of the feeding unit 100 is described later.

The separating unit 40 includes a separating roller 41, a separating roller holder 42 that rotatably holds the separating roller 41, a separating base 43 that swingably holds the separating roller holder 42, and a separating spring 44 that is held by the separating base 43 and that pushes the separating roller holder. The separating unit 40 is mounted on the apparatus main body 1 so as to face the feed roller 104. The separating roller 41 is pushed against the feed roller 104 by the separating roller spring 44. The separating roller 41 is mounted on the separating roller holder 42 via a torque limiter (not shown). The separating roller 41 may be connected to, via a torque limiter, a driving shaft to which driving in a direction opposite to a sheet feeding direction is transmitted from a driving source (not shown), such as a motor.

The feeding cassette 50 includes a box-shaped cassette tray 52 and a stacking plate 51 that is swingably mounted on the cassette tray 52 and on which sheets S are stacked.

Next, a sheet feeding operation of the sheet feeding device 30 is described. When the feeding cassette 50 is inserted into the apparatus main body 1, the stacking plate 51 is raised, and a topmost sheet Sa of the stacked sheets S and the pickup roller 103 abut on each other. The pickup roller 103 and the feed roller 104 are both subjected to driving from a driving source (not shown) and rotate counterclockwise in FIG. 2. Sheets S fed from the feeding cassette 50 by the rotation of the pickup roller 103 are separated and fed one sheet at a time by the feed roller 104 and the separating roller 41. Thereafter, the sheets S are conveyed to the registration roller pair 16 by a conveyance roller pair 33.

Feeding Unit

Figure 3A:
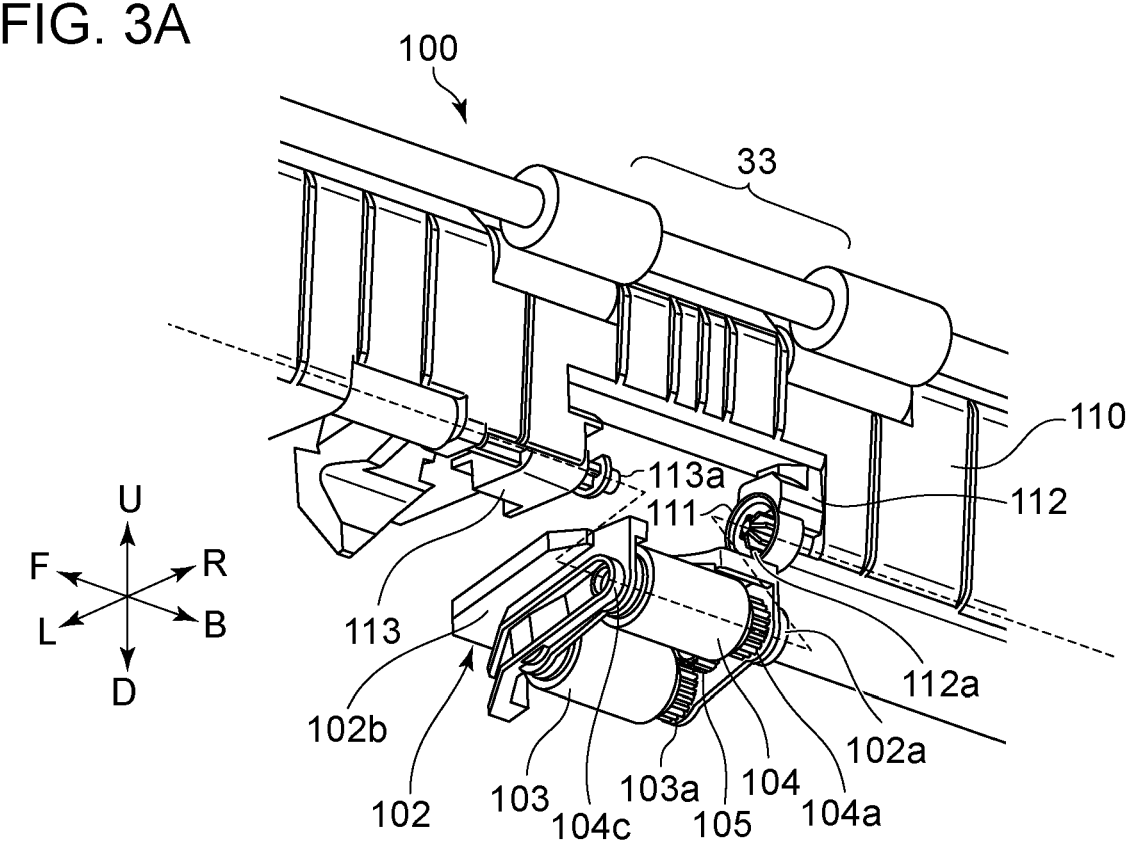
FIGS. 3A and 3B are each a perspective view of a holding structure of a roller unit according to the first embodiment, with FIG. 3A being a lower-right perspective view of the image forming apparatus and FIG. 3B being an upper-left perspective view of the image forming apparatus.
Figure 3B:
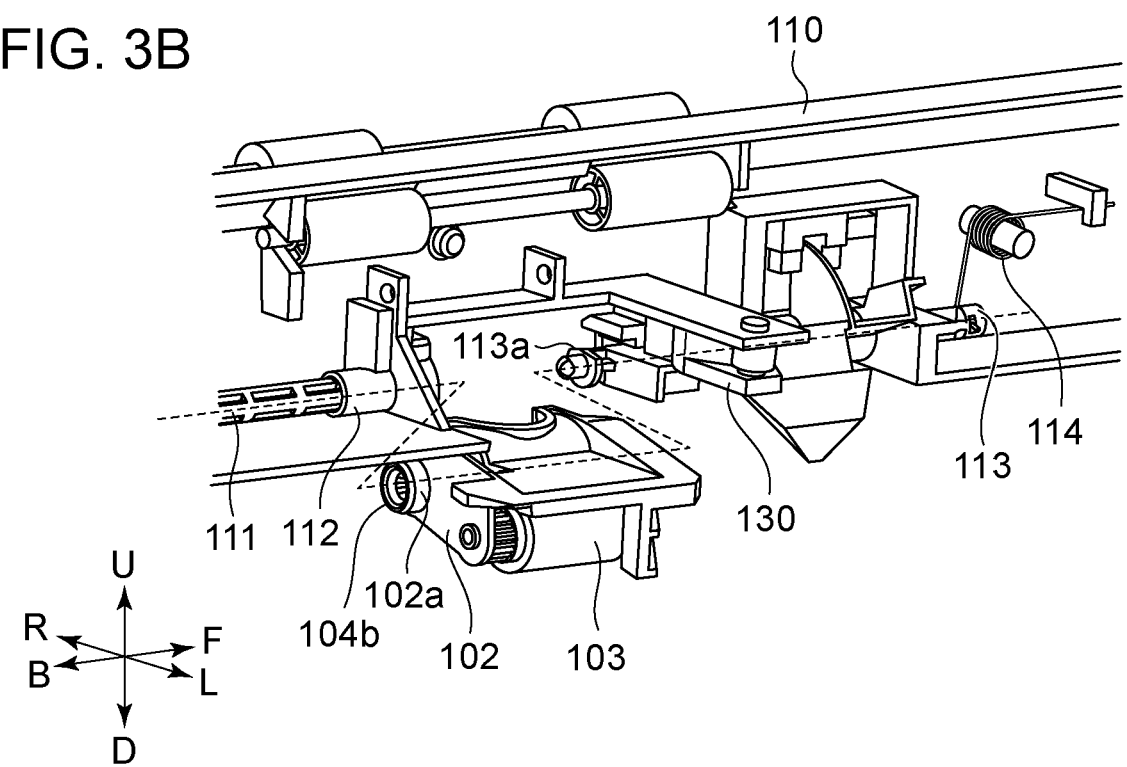

Next, a structure of the feeding unit 100 and a holding structure of the roller unit 101 of the feeding unit 100 are described with reference to FIGS. 3A and 3B. FIGS. 3A and 3B are each a perspective view of the holding structure of the roller unit 101, with FIG. 3A being a perspective view from a lower right direction in FIG. 1 and FIG. 3B being a perspective view from an upper left direction in FIG. 1.

A feeding frame 110 is mounted on the apparatus main body, and the feeding unit 100 is provided on the feeding frame 110. A driving shaft (supporting shaft) 111 that is rotated by being subjected to driving from a motor (not shown) is supported at the feeding frame 110 via a bearing 112. The driving shaft 111 is a supporting member that, when the roller unit 101 has been installed on the feeding frame 110, supports an end side of the roller unit 101 in a rotational axis direction of the pickup roller 103. At the feeding frame 110, a slide shaft (movable shaft) 113 is a movable member that is supported so as to be movable in the front-back direction coaxially with the driving shaft 111. The slide shaft 113 is subjected to an urging force in the direction B (direction towards the driving shaft 111) by an urging spring 114, which is an urging member. When the roller unit 101 has been installed on the feeding frame 110, the slide shaft 113 supports the other end side of the roller unit 101 in the rotational axis direction of the pickup roller 103.

The roller unit 101 of the feeding unit 100 includes, for example, the roller holder 102, the pickup roller 103, the feed roller 104, and a transmission gear 105. The roller unit 101 is removable from the feeding frame 110, which is an installation portion. A gear portion 103a is provided at an end of the pickup roller 103. A gear portion 104a is provided at an end of the feed roller 104. The transmission gear 105 is disposed between and engages with the gear portion 103a and the gear portion 104a. A coupling portion 104b including a toothed portion that engages with a toothed portion that is formed at an end of the driving shaft 111 is integrally provided with the gear portion 104a of the feed roller 104.

The bearing 112 that is provided at the feeding frame 110 includes a recessed portion 112a that is concentric with respect to the driving shaft 111. A circular hollow protrusion 102a that is provided on the roller holder 102 can engage with (can be fitted to) this recessed portion 112a. Inside the recessed portion 112a, an end portion of the driving shaft 111 is coaxially positioned, and a hollow portion of the protrusion 102a and a coupling portion 104b of the feed roller 104 are coaxially disposed. Due to this structure, when the protrusion 102a of the roller holder 102 has been fitted to the recessed portion 112a of the bearing 112, the toothed portion of the end of the driving shaft 111 and the toothed portion of the coupling portion 104b engage with each other.

Further, the slide shaft 113 that is coaxially disposed with the driving shaft 111 is provided at the feeding frame 110. An end portion 113a of the slide shaft 113 engages with (is fitted to) a circular recessed portion 104c that is provided on a side opposite to the coupling portion 104b of the feed roller 104. By this, the roller unit 101 is interposed between the driving shaft 111 and the slide shaft 113, and is swingably held by the feeding frame 110 such that the pickup roller 103 moves up and down with respect to the shafts 111 and 113 as swing fulcra.

In this state, driving from a driving source (not shown) is transmitted to the feed roller 104 via the driving shaft 111. Further, in the roller unit 101, the driving that is transmitted to the feed roller 104 is transmitted from the gear portion 103a to a gear portion 104a via the transmission gear 105, and the pickup roller 103 is rotated.

Figure 4A:
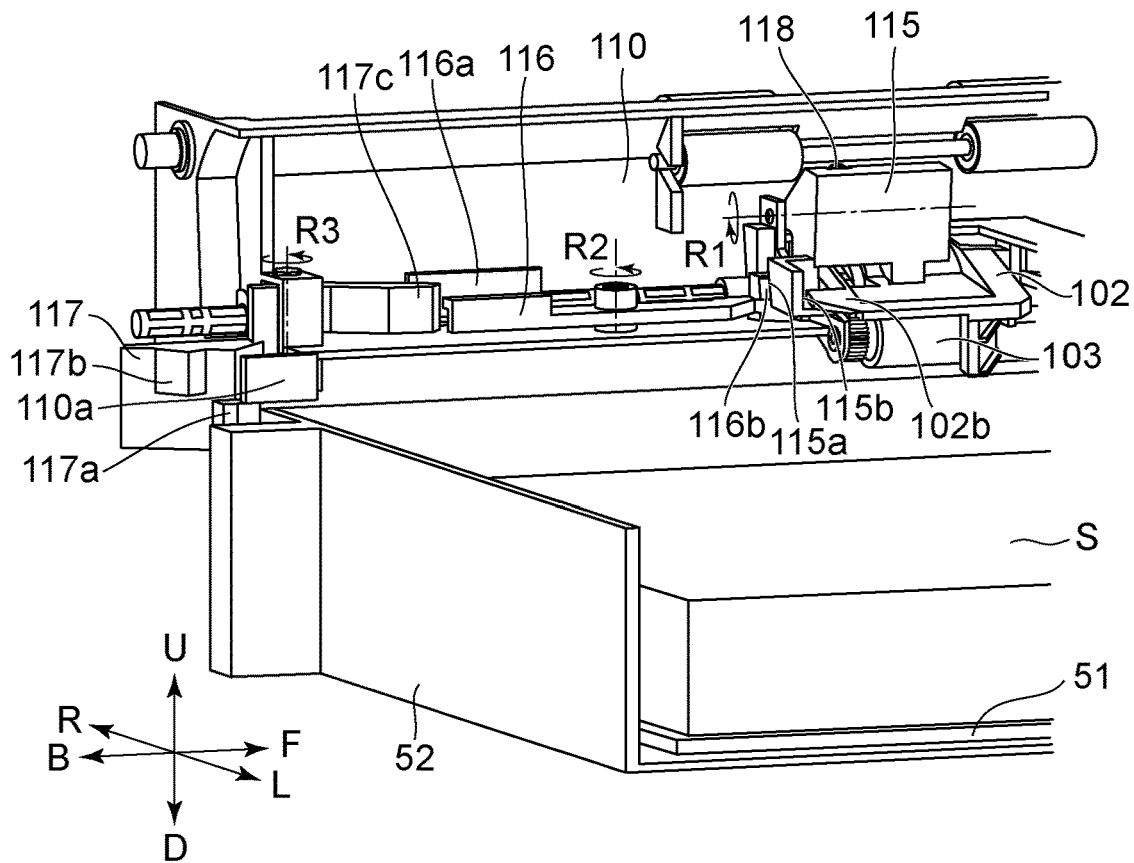
FIGS. 4A and 4B each show a feeding unit before a stacking plate of a feeding unit according to the first embodiment is raised, with FIG. 4A being a perspective view thereof and FIG. 4B being a sectional view thereof.
Figure 4B:
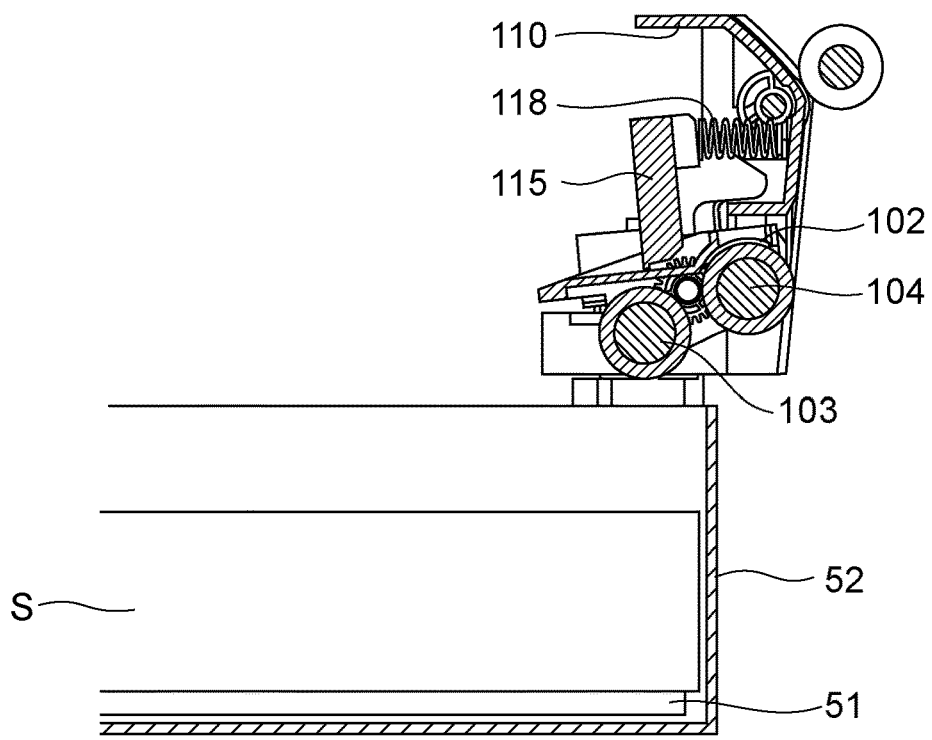
Figure 5A:
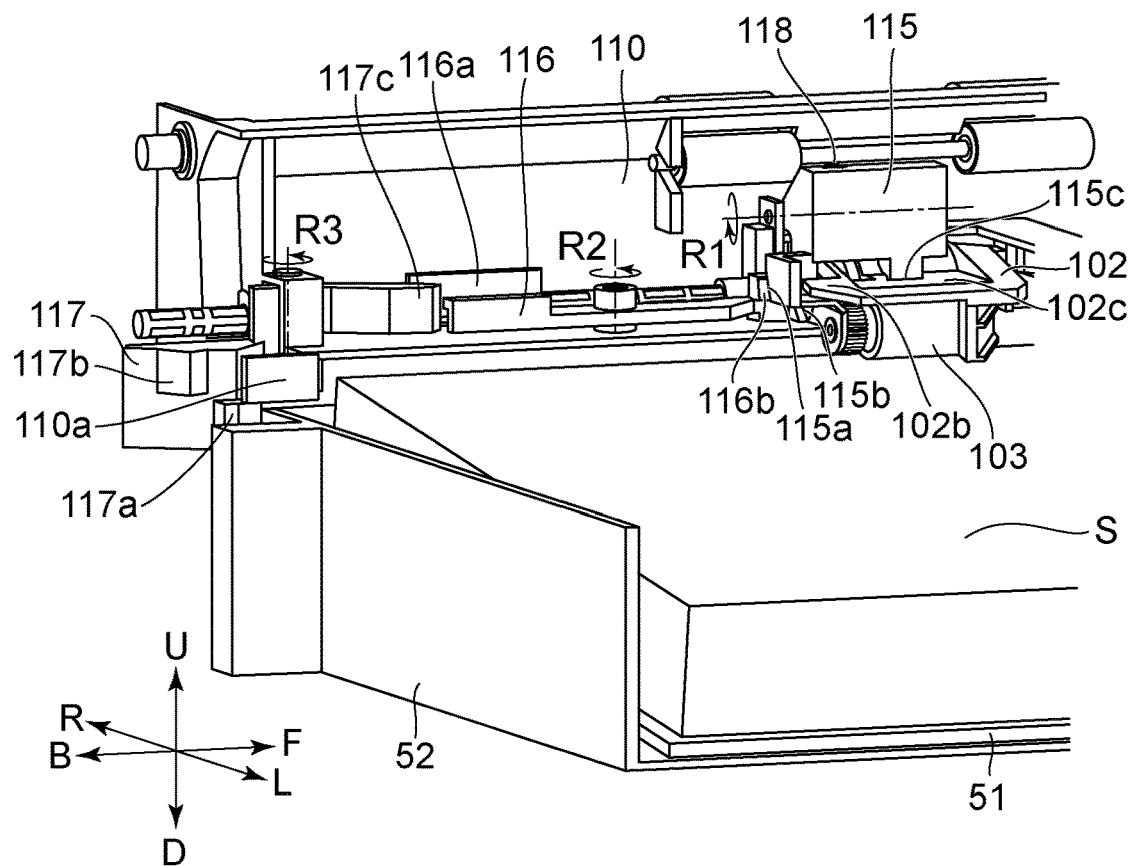
FIGS. 5A and 5B each show the feeding unit after the stacking plate of the feeding unit according to the first embodiment has been raised, with FIG. 5A being a perspective view thereof and FIG. 5B being a sectional view thereof.
Figure 5B:
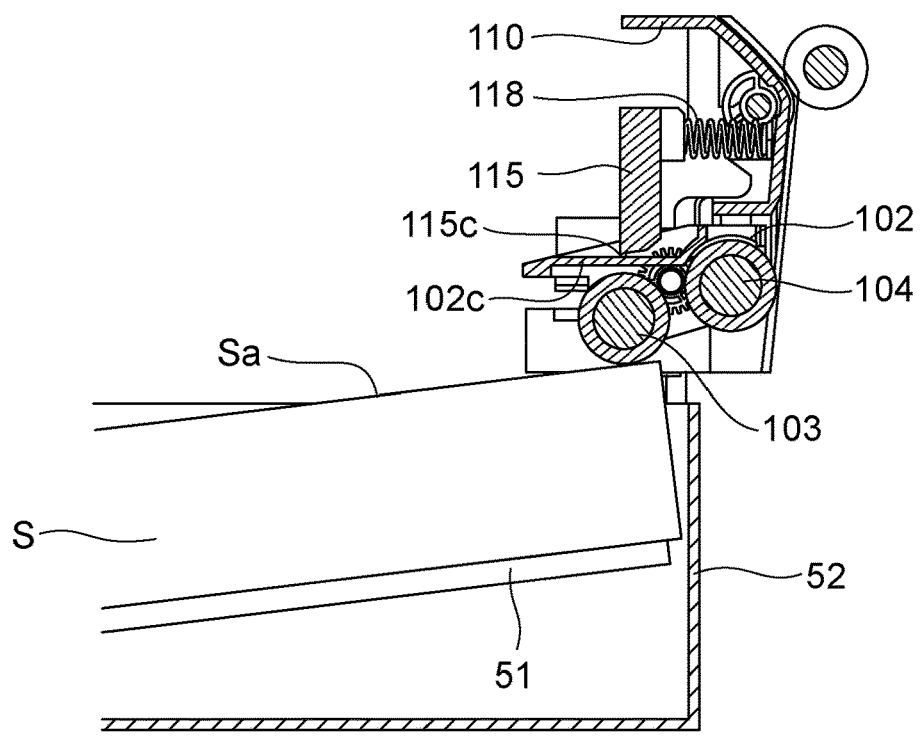

Next, the other structures that are provided at the feeding unit 100 are described with reference to FIGS. 4A to 6B. The roller unit 101 of the embodiment is configured to be swingable in accordance with attaching/detaching operations of the feeding cassette 50 with respect to the apparatus main body 1 and raising operations of the stacking plate 51. FIGS. 4A and 4B show a state before the stacking plate 51 is raised after insertion of the feeding cassette 50. FIGS. 5A and 5B show a state after the stacking plate 51 has been raised. FIGS. 6A and 6B show a state in which the feeding cassette 50 has been drawn out from the apparatus main body 1. Regarding these figures, FIGS. 4A, 5A, and 6A are perspective views, and FIGS. 4B, 5B, and 6B are sectional views formed by cutting a plane that is perpendicular to an axis at the center of the pickup roller 103 in the axial direction.

The feeding frame 110 rotatably holds a pushing member 115, a first linkage member 116, and a second linkage member 117. The pushing member 115 that abuts on the roller unit 101 to urge the pickup roller 103 downward is provided at the feeding frame 110. The pushing member 115 is urged in a direction R1 in FIG. 4A about a pivot by a pressing spring 118. The pushing member 115 includes a first pushing-up portion 115a that is capable of abutting on a guide portion 102c, which is a top surface of the roller holder 102. By using an elastic force of the pressing spring 118, the pushing member 115 urges the roller holder 102 such that the roller holder 102 rotates counterclockwise in FIG. 4B.

The first pushing-up portion 115a including a pushing-up surface 115b that abuts on a lower surface of a plate-shaped tab portion 102b that is provided at the roller holder 102 is provided at the pushing member 115. In FIG. 4B, when the pushing member 115 has rotated clockwise, the first pushing-up portion 115a causes the roller holder 102 to rotate clockwise about a pivot of the feed roller 104 (driving shaft 111).

The first linkage member 116 is urged in a direction R2 in FIG. 4A about a pivot by a spring (not shown), and includes, at an end portion, a second pushing-up portion 116b that engages with the first pushing-up portion 115a of the pushing member 115. The first linkage member 116 includes, at the other end, an abutting surface 116a that is engageable with an arm portion 117c of the second linkage member 117.

The second linkage member 117 is urged in a direction R3 in FIG. 4A about a pivot by a spring (not shown). The second linkage member 117 includes a second locking portion 117b that is abuttable on a stopper portion 110a of the feeding frame 110 when the second linkage member 117 has rotated in the direction R3.

With reference to FIGS. 6A and 6B, the state of each member when the feeding cassette 50 is in a removed state is described. The second linkage member 117 is urged in the direction R3 by an elastic force of a spring (not shown), and the second locking portion 117b is stopped as a result of abutting on the stopper portion 110a of the feeding frame 110. Although the second linkage member 117 is urged in the direction R2 by an elastic force of a spring (not shown), the arm portion 117c is pushed against the abutting portion surface 116a of the first linkage member 116, is rotated in a direction opposite to R2, and is stopped. This is because the elastic force of the spring that urges the second linkage member 117 is set larger than the elastic force of the spring that urges the first linkage member 116.

The second pushing-up portion 116b of the first linkage member 116 engages with the first pushing-up portion 115a of the pushing member 115 from therebelow, and, as shown in FIG. 6B, causes the pushing member 115 to rotate in a direction opposite to the direction R1 against the elastic force of the pressing spring 118. Further, when the pushing-up surface 115b of the pushing member 115 pushes up the tab portion 102b of the roller holder 102 from therebelow, the roller unit 101 is rotated counterclockwise around the driving shaft 111. In this state, the pickup roller 103 is in an upwardly moved state.

With the roller unit 101 rotated by the first linkage member 116, the guide portion 102c that is provided at the roller holder 102 is stopped at a position where the rollers 103 and 104 of the roller unit 101 are substantially parallel to each other. This state corresponds to an installation position (described later) where the roller unit 101 is allowed to be removed from and mounted on the feeding unit 100.

FIGS. 4A and 4B each show a state before the stacking plate 51 is raised when the feeding cassette 50 is inserted at an installation position in the apparatus main body 1 where sheets can be fed. In this state, the second linkage member 117 is rotated in a direction opposite to the direction R3 as a result of the first engaging portion 117a being pushed against an urging force of a spring B by the cassette tray 52 of the feeding cassette 50 that is inserted.

Since the arm portion 117c of the second linkage member 117 is rotated in a direction opposite to the direction R3, the first linkage member 116 is rotated in the direction R2 by an urging force of a spring (not shown). The abutting surface 116a is stopped as a result of abutting on the arm portion 117c of the second linkage member 117.

The first pushing-up portion 115a is disengaged from the pushing-up portion 116b of the first linkage member 116, and the pushing member 115 is rotated counterclockwise in FIG. 4B and is stopped by an urging force of the pressing spring 118. At this time, since the pushing-up surface 115b of the pushing member 115 is also moved downward, the roller unit 101 rotates around the driving shaft 111 due to its own weight. Then, when the tab portion 102b of the roller holder 102 abuts on the pushing-up surface 115b of the pushing member 115, the roller unit 101 is stopped. In this state, the pickup roller 103 is in a downwardly moved state.

As shown in FIGS. 5A and 5B, when the cassette tray 52 is installed in the apparatus main body 1, a lifter mechanism (not shown) raises the stacking plate 51, and the sheets S on the stacking plate 51 abut on the lowered pickup roller 103. When the stacking plate 51 is further raised, and a detecting unit (not shown) detects that a topmost sheet Sa has lifted the pickup roller 103 and has reached a predetermined height, the raising of the stacking plate 51 is stopped. The predetermined height corresponds to a position where the topmost sheet Sa can be fed by the pickup roller 103.

Here, the tab portion 102b of the roller holder 102 separates from the pushing-up portion 116a of the first linkage member 116. Further, the guide portion (top surface) 102c of the roller holder 102 abuts on a pushing portion 115c of the pushing member 115 and causes the pushing member 115 to rotate in a direction opposite to the direction R1 against an urging force of the pressing spring 118. In the state in which the raising of the stacking plate 51 is stopped, the urging force of the pressing spring 118 acts at a location between the pickup roller 103 and the topmost sheet Sa on the stacking plate 51. By this, when the pickup roller 103 rotates, the sheets S can be fed by friction force. This position corresponds to a feeding position of the roller unit 101.

In this state, the pickup roller 103 rotates to send out the sheets, and the sheets are separated and sent out one sheet at a time by the feed roller 104 and the separating roller 41. When the sheets are sent out and the position of the topmost surface of the sheets on the stacking plate 51 is lowered, this is detected by the detecting unit (not shown), and, based on this detection, the lifter mechanism (not shown) raises the stacking plate 51, and the top surface of the sheets is moved to the predetermined height. In this way, the topmost sheet that is stacked on the stacking plate 51 is kept within a range of height that allows the sheets to be fed.

Operation for Removing Feeding Roller Unit

Next, an operation for removing the roller unit 101 from the feeding unit 100 is described with reference to FIGS. 7A to 7C.

Figure 7A:
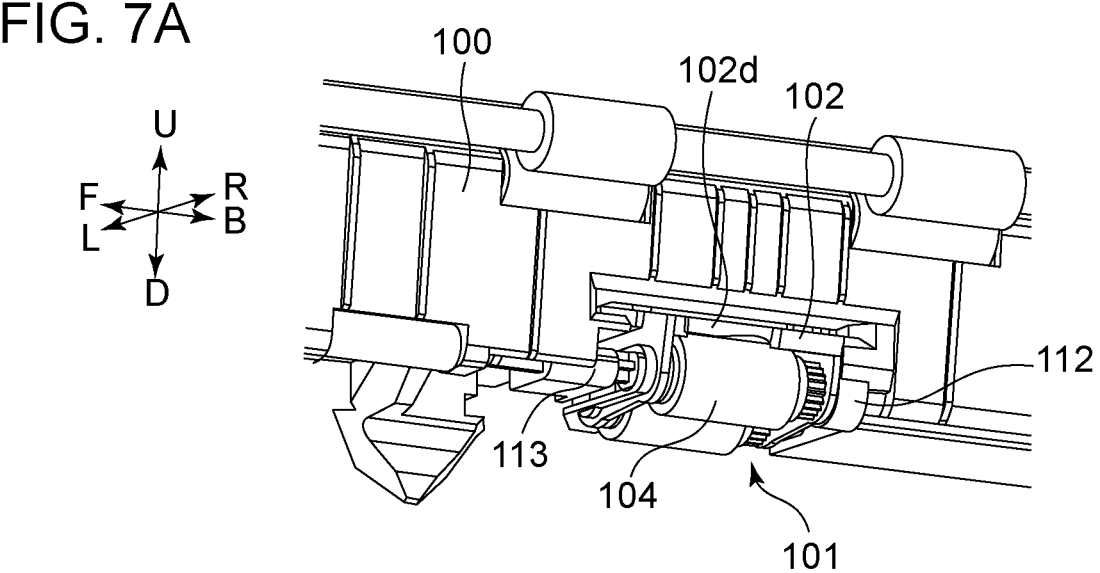
FIGS. 7A to 7C show a procedure for removing the roller unit according to the first embodiment, with FIG. 7A being a perspective view showing an installation position, FIG. 7B being a perspective view of a state in which the roller unit has been moved in an axial direction, and FIG. 7C being a perspective view of a state in which a feeding roller unit has been moved in a removing direction.

FIG. 7A is a perspective view of the feeding unit 100 at the installation position of the roller unit 101. In this state, the separating unit 40 is removed, or is rotated and moved to a position that does not hinder the removal of the roller unit 101. The roller unit 101 is removed by opening an opening/closing door that is provided at a side surface of the apparatus main body 1.

Figure 7B:
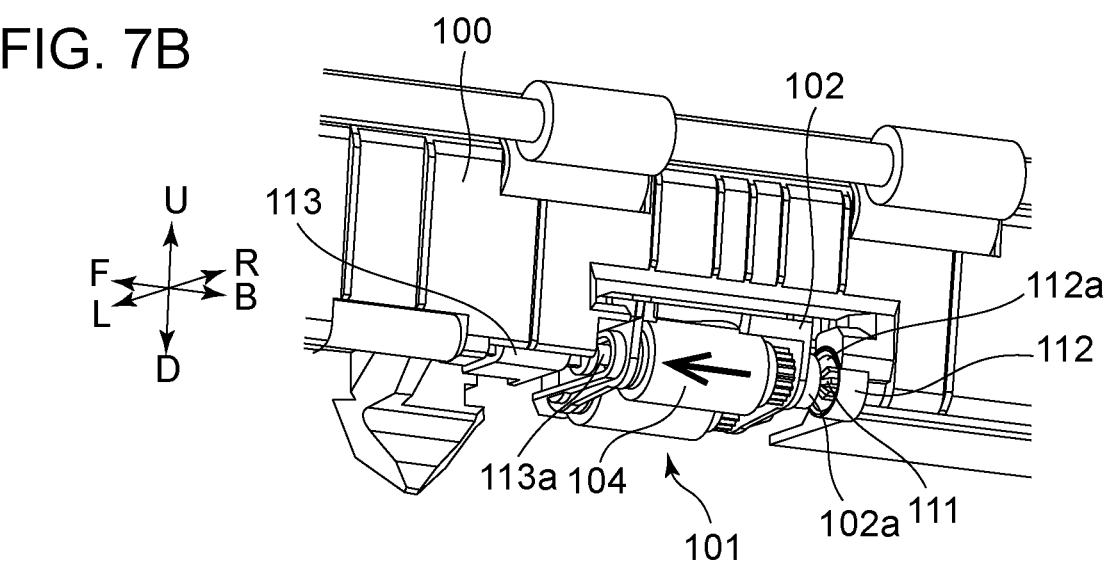
Figure 7C:
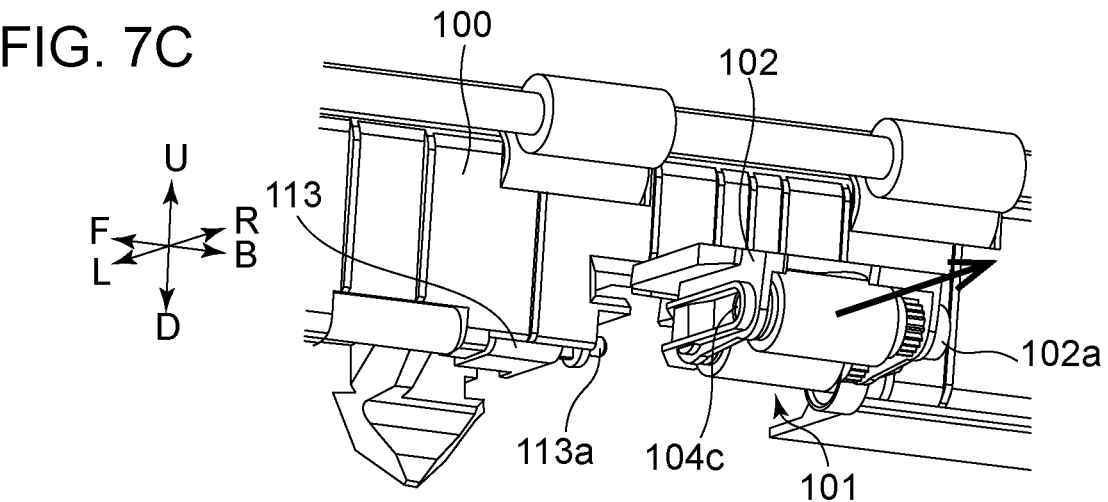

From the state of FIG. 7A, when a user operates the roller unit 101 and the slide shaft 113 is moved in a direction F against an urging force of the urging spring 114 for the slide shaft 113, the roller unit 101 is at the position shown in FIG. 7B. Here, the direction F corresponds to a direction in which the roller unit 101 separates from the driving shaft 112.

At this position of the roller unit 101, the protrusion 102a of the roller holder is separated from the recessed portion 112a of the bearing, and the toothed portion at the end of the driving shaft 111 is also separated from the toothed portion of the coupling portion 104b of the feed roller. When moving the roller unit 101 in the direction F, an interlocking device E (described later) causes the end portion 113a of the slide shaft 113 to separate from the recessed portion 104c of the feed roller. This allows the roller unit 101 to be removed from the driving shaft 111 and the slide shaft 113 and drawn out in the direction R as shown in FIG. 7C. The direction in which the roller unit 101 is drawn out corresponds to a direction perpendicular to an axial direction of the feed roller 104.

Figure 12A:
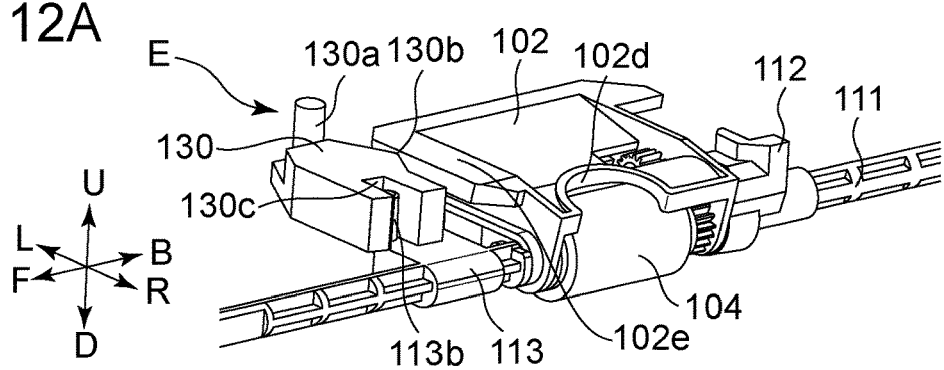
FIGS. 12A to 12D are perspective views showing an operation of the interlocking device according to the first embodiment, with FIG. 12A showing the position in FIGS. 8A and 8B, FIG. 12B showing the position in FIGS. 9A and 9B, FIG. 12C showing the position in FIGS. 10A and 10B, and FIG. 12D showing the position in FIGS. 11A and 11B.
Figure 12B:
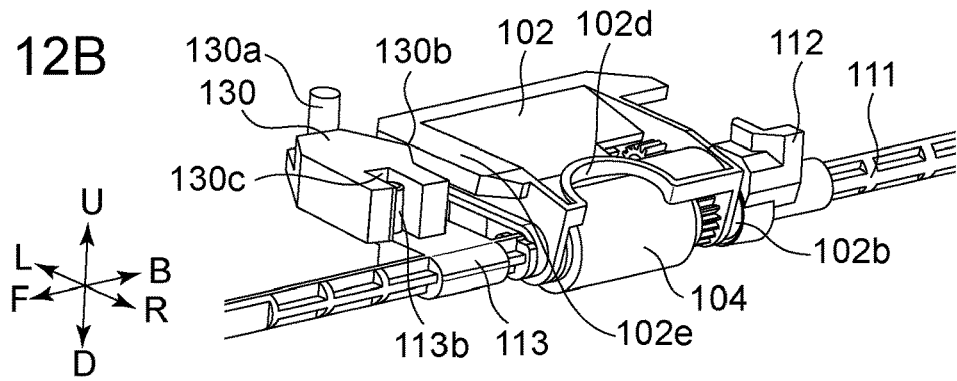
Figure 12C:
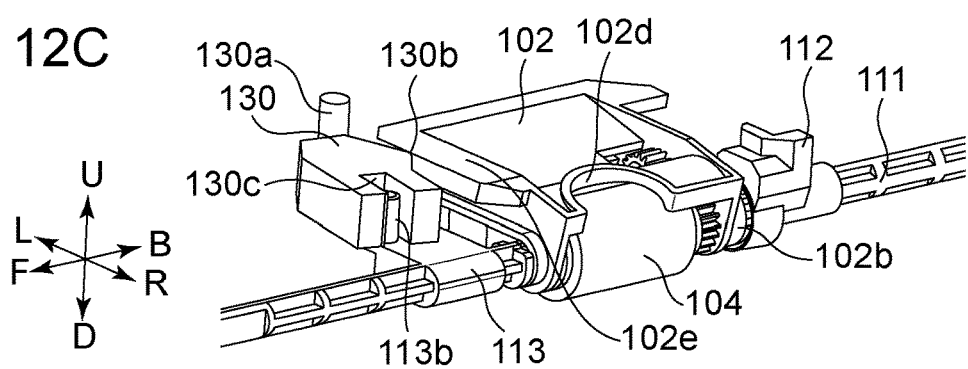
Figure 12D:
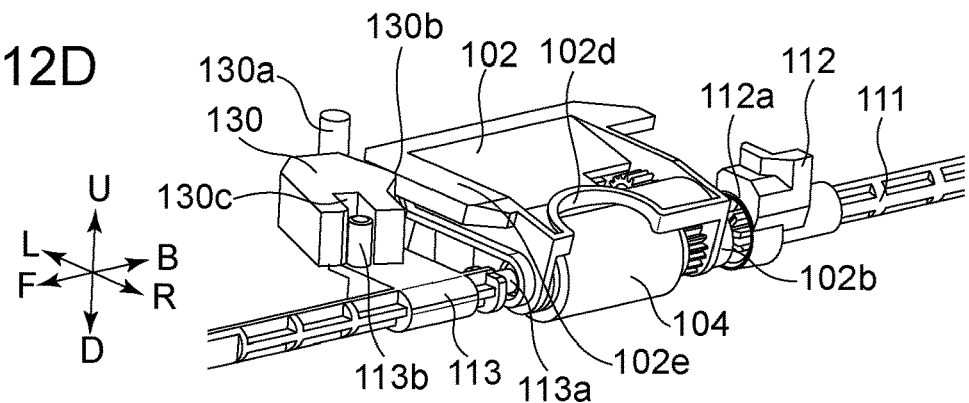

Here, a detailed structure of the interlocking device E in the embodiment is described with reference to FIGS. 8A to 11B. FIGS. 8A to 11B show the operations of the interlocking device E one after another when the roller unit 101 is moved forward. FIGS. 8A, 9A, 10A, and 11A show the roller unit 101 and the interlocking device E when viewed in the direction U from thereabove. FIGS. 8B, 9B, 10B, and 11B are sectional views of the roller unit 101 and the interlocking device E when viewed in the direction L from the right of the center of the feed roller 104 of FIGS. 8A, 9A, 10A, and 11A, respectively. FIGS. 12A to 12D are perspective views of the interlocking device E shown in FIGS. 8A to 11B. FIG. 12A corresponds to FIGS. 8A and 8B. FIG. 12B corresponds to FIGS. 9A and 9B. FIG. 12C corresponds to FIGS. 10A and 10B. FIG. 12D corresponds to FIGS. 11A and 11B.

Figure 8A:
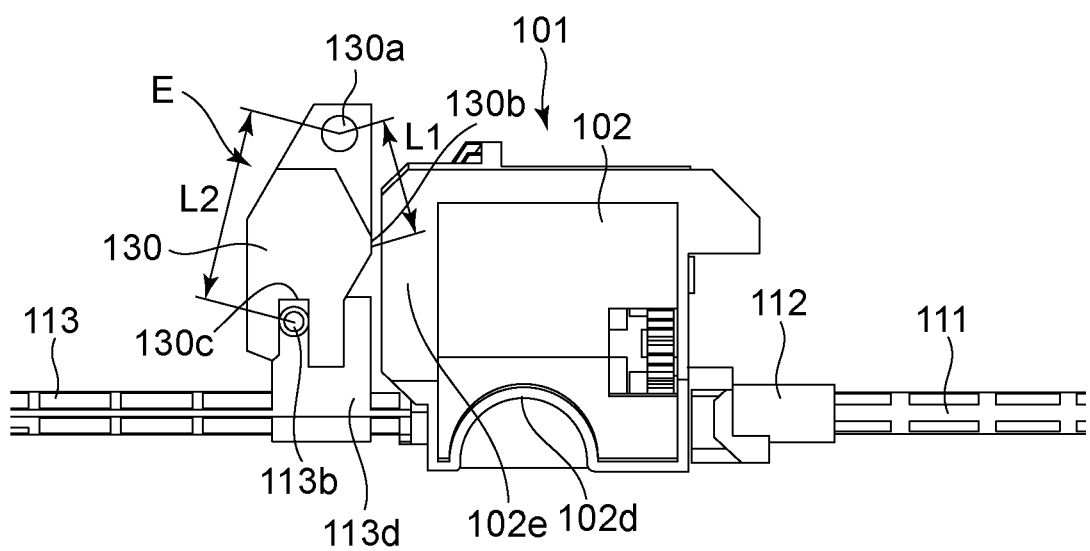
FIGS. 8A and 8B each show an interlocking device at the installation position of the roller unit according to the first embodiment, with FIG. 8A being a top view thereof and FIG. 8B being a rightward-direction sectional view thereof.
Figure 8B:
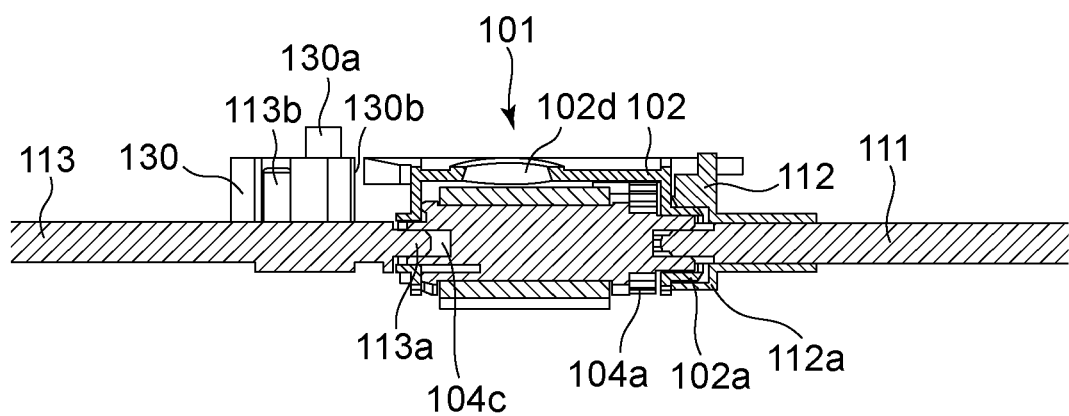
Figure 9A:
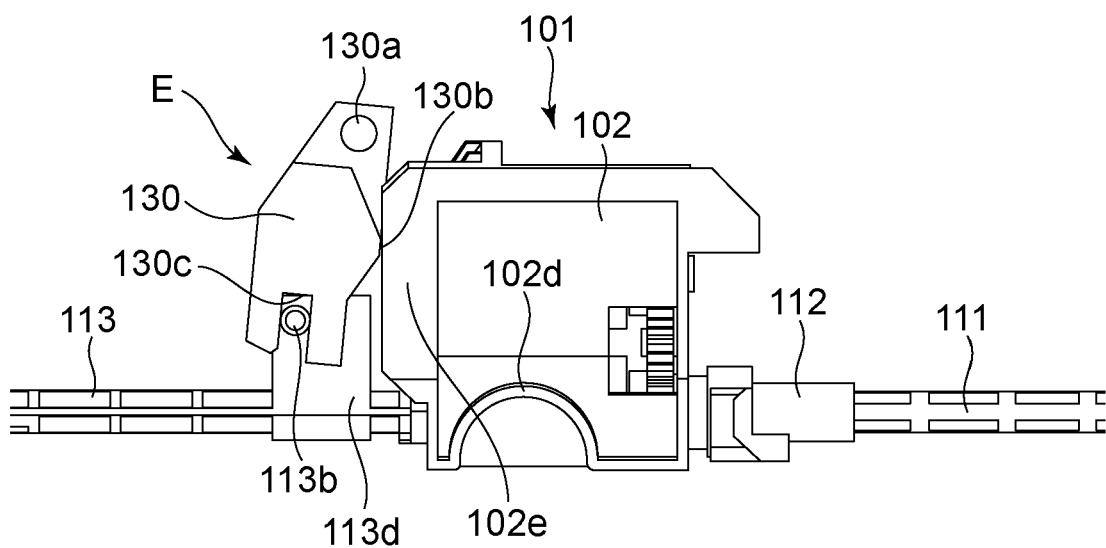
FIGS. 9A and 9B each show the interlocking device at a position where the roller unit according to the first embodiment abuts on a lever member, with FIG. 9A being a top view thereof and FIG. 9B being a rightward-direction sectional view thereof.
Figure 9B:
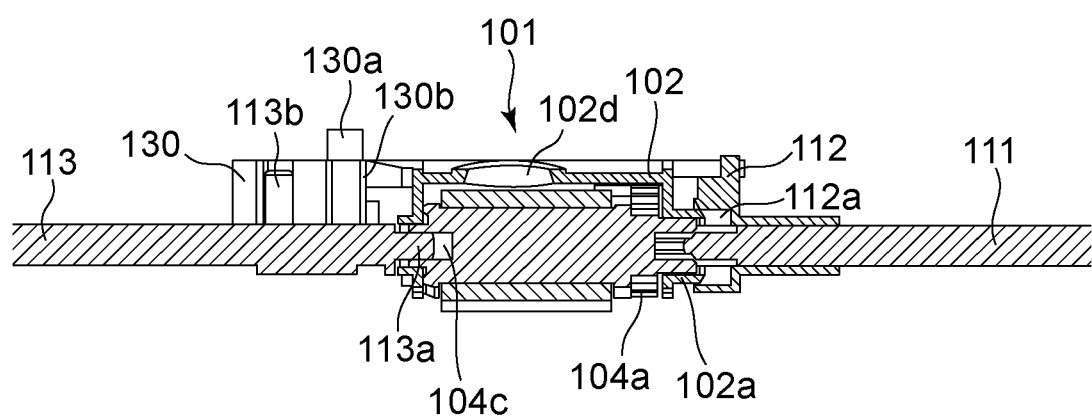

FIGS. 8A and 8B each show the roller unit 101 and the interlocking device E at the installation position shown in FIGS. 6A and 6B. First, the structure of the interlocking device E is described.

The interlocking device E includes a lever member 130 that is supported by the feeding frame 110 so as to be rotatable around a shaft portion 130a. The lever member 130 includes an abutting portion 130b that abuts on the roller holder 102. Here, the abutting portion 130b is a push portion that is pushed by the roller holder 102. The interlocking device E also includes an engagement portion 113b provided on a mounting portion 113d fixed to the slide shaft 113. A C-shaped engaging portion 130c that engages with the engagement portion 113b is formed at the lever member 130. Here, the engaging portion 130c is a contacting portion for moving the slide shaft 113. The lever member 130 is a rotating member that rotates around the shaft portion 130a.

Here, a distance between the shaft portion 130a and the abutting portion 130b of the lever member 130 is L1, and a distance between the shaft portion 130a of the lever member 130 and the engagement portion 113b of the slide shaft 113 is L2. The distances L1 and L2 are set such that L2>L1. In order not to hinder the swinging of the roller unit 101 between the feeding position and the installation position, in a state in which the roller unit 101 is mounted on the feeding unit 100, the lever member 130 is positioned. A gap is provided between the abutting portion 130b of the positioned lever member 130 and the roller holder 102. This gap prevents the lever member 130 from resisting the upward and downward movement of the roller unit 101. Further, on a side opposite to the tab portion 102b of the roller holder 102, a plate-shaped projection 102e that abuts on the lever member is provided, and a hollow 102d for being caught by a finger when a user operates the roller unit 101 is provided.

Next, the operation of the interlocking device E for removing the roller unit 101 is described. When the roller unit 101 is operated and moved in the direction F from the installation position of the roller unit 101 in FIGS. 8A and 8B by catching the hollow 102d with a finger, first, the roller unit 101 opposes an urging force in the direction B of the urging spring 114 and the slide shaft 113 moves as one body. Then, the abutting portion 130b of the lever member 130 is placed in a state shown in FIG. 9 in which the abutting portion 130b of the lever member 130 abuts on the projection 102e of the roller holder 102.

Figure 10A:
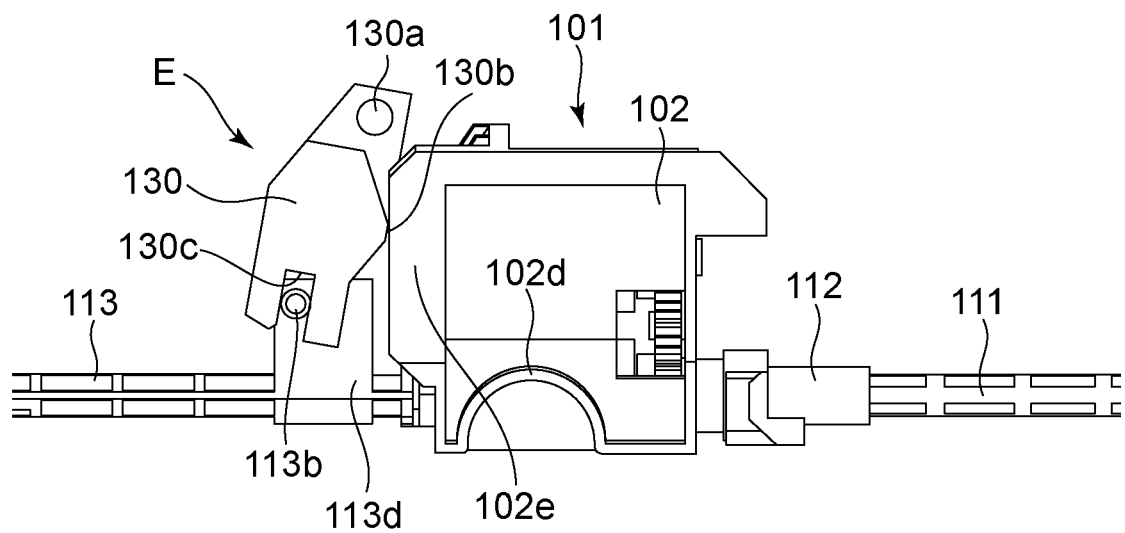
FIGS. 10A and 10B each show the interlocking device at a position where the roller unit according to the first embodiment pushes in the lever member and a slide shaft starts to separate from the feeding roller unit, with FIG. 10A being a top view thereof and FIG. 10B being a rightward-direction sectional view thereof.
Figure 10B:
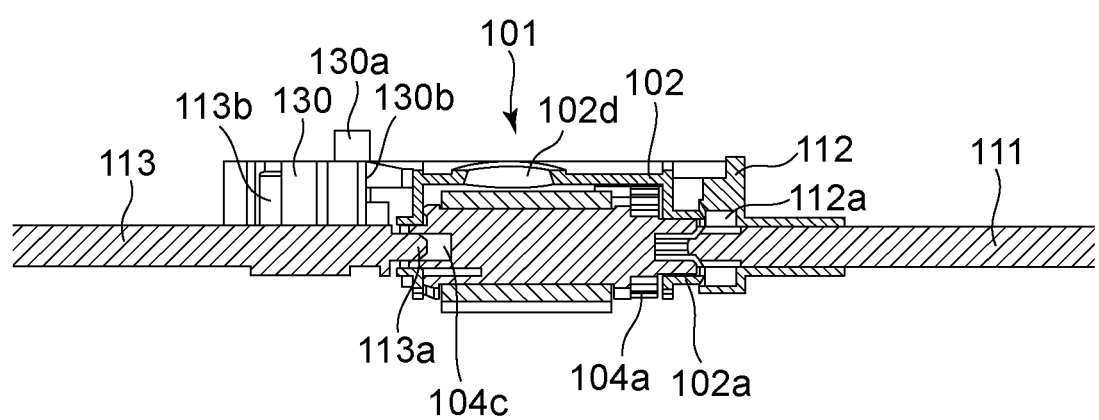
Figure 11A:
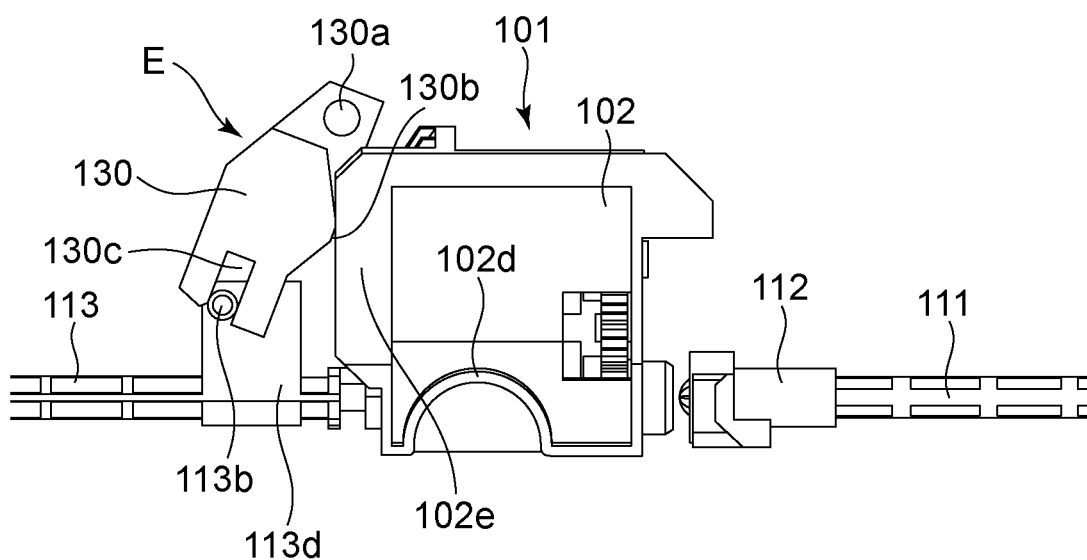
FIGS. 11A and 11B each show the interlocking device at a position where the roller unit according to the first embodiment is capable of being drawn out, with FIG. 11A being a top view thereof and FIG. 11B being a rightward-direction sectional view thereof.
Figure 11B:
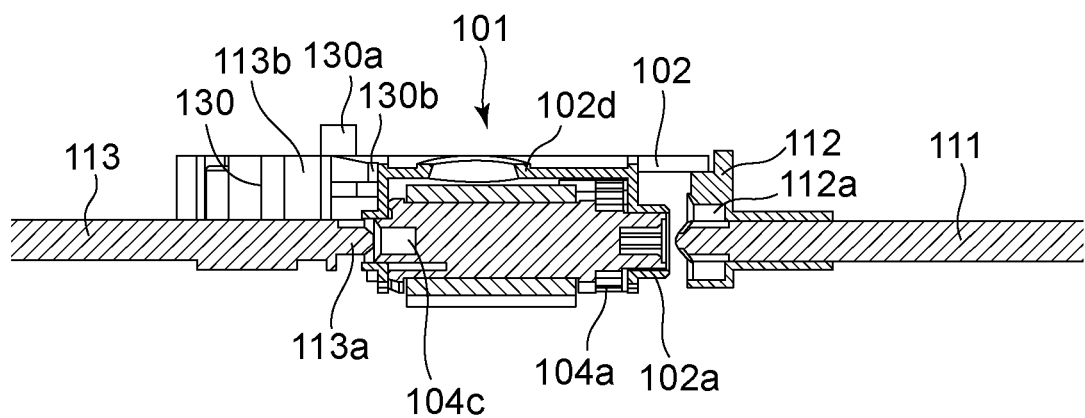

Further, after the projection 102e of the roller holder 102 has abutted on the lever member 130, the roller unit 101 causes the lever member 130 to move in the direction while causing it to rotate about the shaft portion 130a as a fulcrum. Here, since the arrangement is such that L2>L1, the slide shaft 113 moves by an amount that is larger than the moving amount of the roller unit 101 in the forward direction (axial direction). As a result, as shown in FIG. 10B, the end portion 113a of the slide shaft 113 gradually starts to separate from the recessed portion 104c of the feed roller. Finally, the projection 102a of the roller holder 102 separates from the recessed portion 112a of the bearing, and the end portion 113a of the slide shaft 113 and the recessed portion 104c of the feed roller separate from each other in the state shown in FIG. 11B (FIG. 7B). In this state, when the roller unit 101 is drawn out in the direction R, the roller unit 101 can be removed from the feeding unit 100 while sliding the projection 102e (abutment portion) of the roller holder 102 on the abutting portion 130b of the lever member 130. At this time, although an urging force of the urging spring 114 that urges the slide shaft 113 is applied to the roller holder 102 from the lever member 130, since the urging force is set relatively small, the urging force does not influence the drawing-out operation of the roller unit 101.

Figure 13:
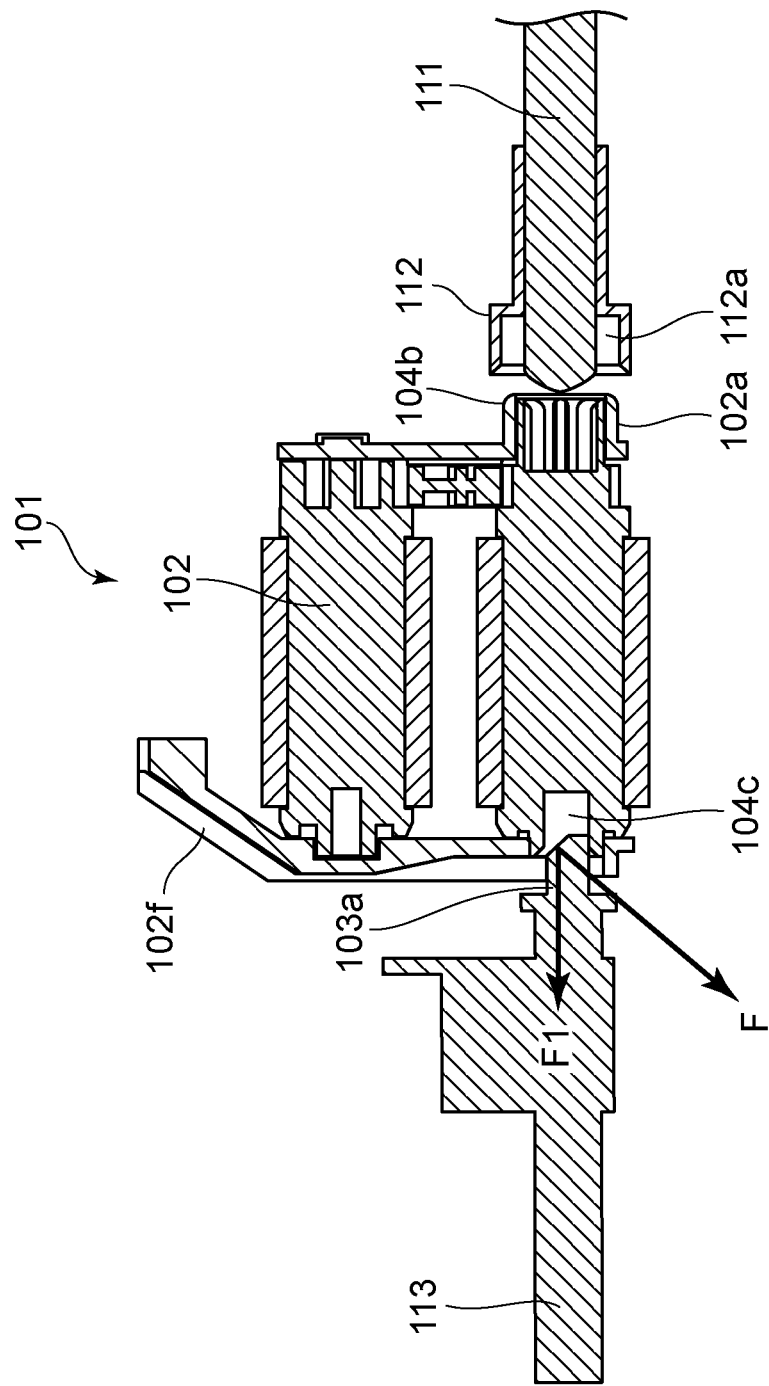
FIG. 13 is an upward-direction sectional view of a state in which the slide shaft according to the first embodiment is not completely separated from a recessed portion of a feed roller.
Figure 14A:
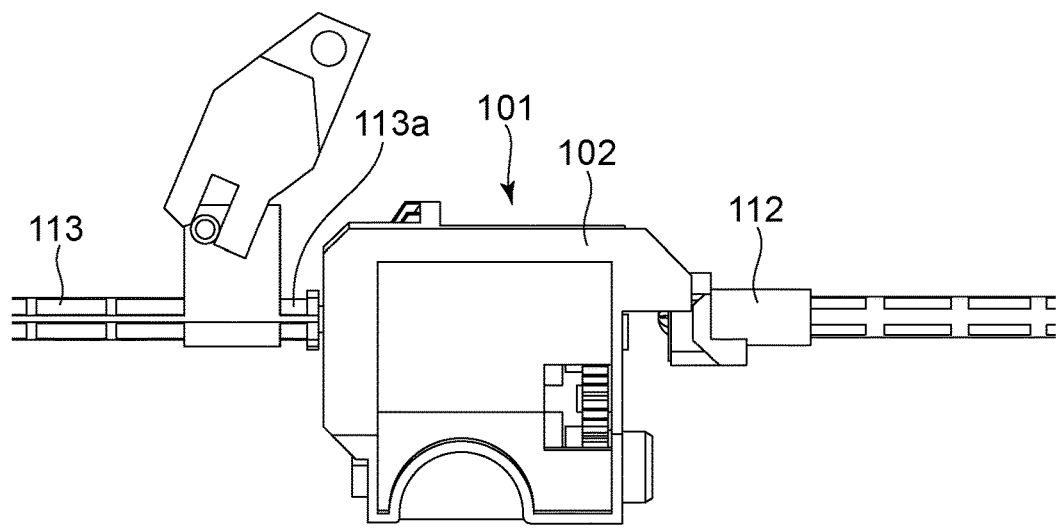
FIG. 14A shows the roller unit and the interlocking device when seen from thereabove in a direction U.
Figure 14B:
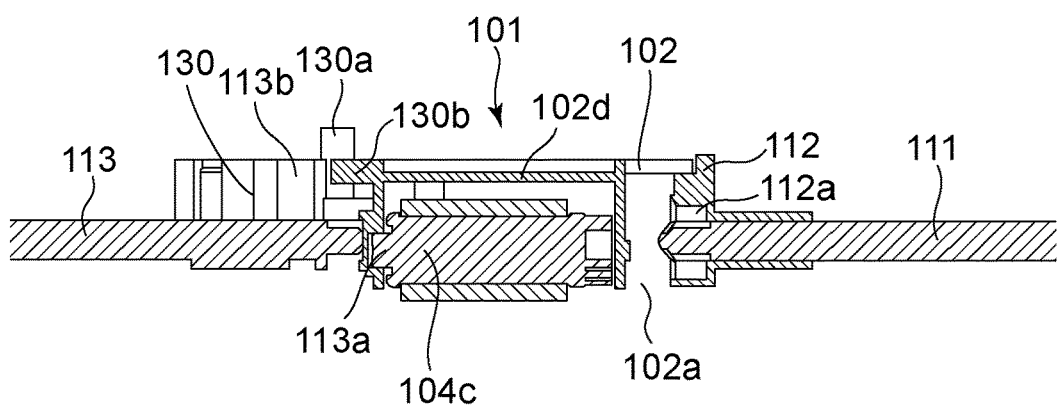
FIG. 14B is a sectional view when seen from the right of the center of the feed roller in FIG. 14A in a direction L.
Figure 14C:
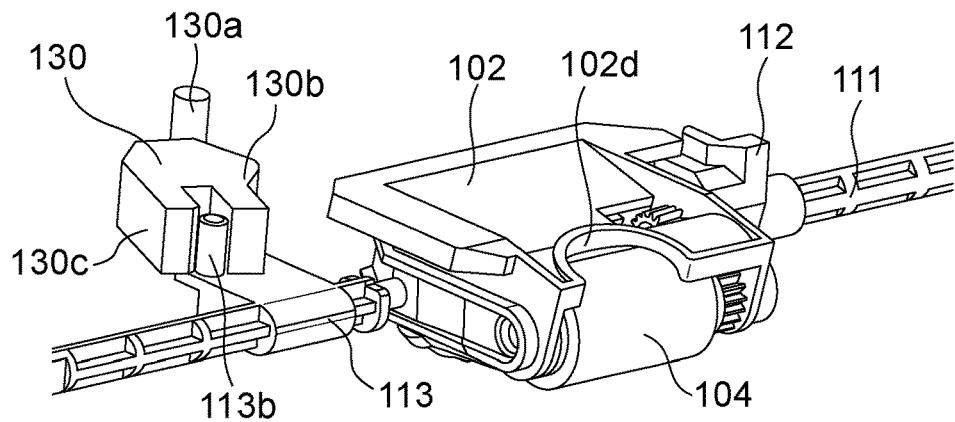
FIG. 14C is a perspective view that describes the interlocking device in FIGS. 14A and 14B.

When the roller unit 101 is to be drawn out in the direction R, the end portion 113a of the slide shaft need not be completely separated from the recessed portion 104c of the feed roller 104. For example, as shown in FIG. 13 (sectional view of an engaging portion where the end portion 113a of the slide shaft and the recessed portion 104c of the feed roller engage with each other when viewed from thereabove), an inclined surface 113c that is provided at the end portion of the slide shaft 113 is provided. If part of the inclined surface 113c protrudes outwardly from the recessed portion 104 of the feed roller, when a user draws out the roller unit 101 towards the right, the slide shaft 113 moves in the direction F due to an R-direction component force F1 of a force F that the inclined surface 113c of the slide shaft 113 is subjected to. Therefore, the roller unit 101 can be drawn out in the direction R even if the slide shaft 113 is not completely separated from the recessed portion 101e of the feed roller. FIG. 14A shows the roller unit 101 and the interlocking device E when seen from thereabove in the direction U. FIG. 14B is a sectional view when seen from the right of the center of the feed roller 104 in FIG. 14A in the L direction. FIG. 14C is a perspective view that describes the interlocking device E in FIGS. 14A and 14B. As shown in FIGS. 14A to 14C, the roller unit 101 is removable from the feeding frame 110.

As described above, when the roller unit 101 has been operated and moved in the direction F from the installation position, the moving amount of the slide shaft 113 is larger than the moving amount of the roller unit 101. As a result, when the roller unit 101 has separated from the driving shaft 111, the slide shaft 113 is also separated from the roller unit 101. Therefore, when the roller unit 101 has been moved in the direction F, the roller unit 101 is easily removed from the feeding frame 110 in the direction R, and the number of steps for replacing the roller unit 101 is reduced, so that usability can be increased.

Operation for Mounting the Feeding Roller Unit

Figure 15A:
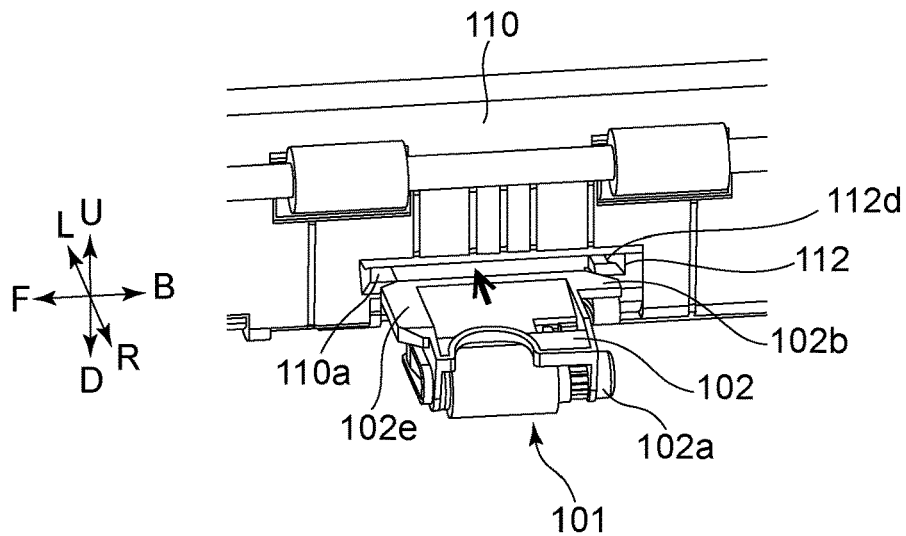
FIGS. 15A to 15C each show a state before insertion of the feeding roller unit according to the first embodiment, with FIG. 15A being a right perspective view thereof, FIGS. 15B being a left perspective view thereof, and 15C being a bottom perspective view thereof.
Figure 15B:
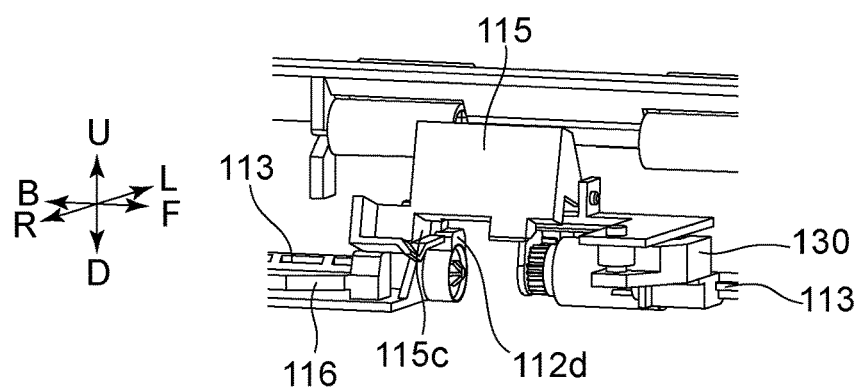
Figure 15C:
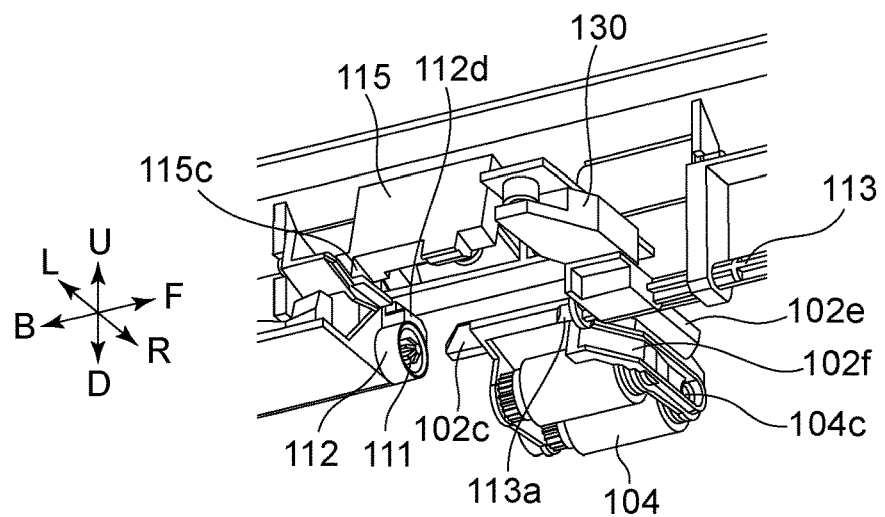

Next, an operation for mounting the roller unit 101 on the feeding frame 110 is described with reference to FIGS. 15A to 15C. FIGS. 15A to 15C are each a perspective view of the feeding unit 100 before insertion of the roller unit 101, with FIG. 15A being a perspective view thereof when seen from an upper right direction, FIG. 15B being a perspective view thereof when seen from a front left direction of the main body, and FIG. 15C being a perspective view thereof when seen from a lower left direction of the main body.

First, before describing the operation for mounting the roller unit 101, the structures involved in the mounting operation are described.

The roller holder 102 includes the projection 102e on the side opposite to the tab portion 102b. On the other hand, the feeding frame 110 includes a guide portion 110a having one side open for guiding the projection 102e of the roller holder 102. The bearing 112 includes a guide portion 112d that has one side open and that is used for guiding the tab portion 102b of the roller holder 102. The open side of the guide portion 110a and the open side of the guide portion 112d face each other. The pushing member 115 also includes a guide portion 115c for guiding the tab portion 102b of the roller holder 102. At the installation position of the roller unit 101, as shown in FIG. 15B, the guide portion 112d of the bearing 112 and the guide portion 115c of the pushing member are disposed on a straight line.

An inclined surface portion 102f is provided at a surface of the roller holder 102 facing the slide shaft 113. When the roller holder 102 is inserted in a direction in which the roller holder 102 is installed at the feeding frame 110, the end portion 113a of the slide shaft 113 slides, and the slide shaft 113 moves along the inclined surface portion 102f in the direction F against an elastic force of the urging spring 114.

The feeding roller unit 101 is mounted by performing this procedure in the reverse order. The roller unit 101 is held, and the projection 102e of the roller holder 102 is positioned so as to be aligned with the guide portion 110a of the feeding frame 110 and the tab portion 102b of the roller holder is positioned so as to be aligned with the guide portion 112d of the bearing 112 and the guide portion 115c of the pushing member 115.

By this, the positions of the roller unit 101 in the front-back direction and the up-down direction are roughly determined. Thereafter, the roller unit 101 is pushed in the L direction. Here, the inclined surface portion 102f of the roller holder 102 shown in FIG. 15C abuts on the end portion 113a of the slide shaft 113, and the roller unit 101 moves in the L direction while retracting the slide shaft 113 in the direction F. When the feed roller 104 is aligned on the same straight line with the driving shaft 111 and the slide shaft 113, the end portion 113a of the slide shaft 113 enters the recessed portion 104c of the feed roller. The roller unit 101 that is subjected to a force of the urging spring 114 automatically moves in the direction R, and is positioned at the installation position.

As described above, the feeding unit 100 includes the guide portions 110a, 112d, and 115c that regulate the movements of the roller unit 101 in the up-down direction and the front-back direction. The roller unit 101 includes the inclined surface portion 102f that causes the slide shaft 113 to retract in the direction F against the urging force of the urging spring 114 when the roller unit 101 moves in the installation direction. Therefore, by only pushing in the roller unit 101 in the L direction, a user can mount the roller unit 101, thereby making it possible to increase usability.

Although the roller unit 101 includes, as rotating bodies, the feed roller 104 and the pickup roller 103, the roller unit 101 may include only one of these rollers. Although the structure for removing the roller unit 101 from the feeding unit 100 is described, the structure may be one for separately removing the feed roller 104, which is a rotating body, or the pickup roller 103, which is a rotating body. For example, when the feed roller 104, itself, is to be removed from the feeding unit 100, shafts on both sides that rotatably support the feed roller 104 are a movable shaft and a supporting shaft.

Second Embodiment

Next, a second embodiment is described with reference to FIGS. 16A to 16D. FIGS. 16A to 16D are perspective views of an operation of an interlocking device E2 according to the second embodiment. Although, in the embodiment, the interlocking device E2 differs from that of the first embodiment in using a rack mechanism and a stepped gear, the other structures are the same. Therefore, such other structures are given the same reference numerals, and are not described in detail.

As shown in FIGS. 16A to 16D, at the interlocking device E2 of the embodiment, a stepped gear 210 is rotatably supported by a feeding frame 110. Hook portions 211a and 211b are held by the feeding frame 110 such that a slide member 211 is movable in the front-back direction, and the slide member 211 includes a rack portion 211c that engages with a gear (small gear) 210a having a small number of teeth of the stepped gear 210.

Similarly to the slide shaft 113 of the first embodiment, a slide shaft (movable shaft) 212 of the embodiment is supported by the feeding frame 110 so as to be movable in the front-back direction coaxially with a driving shaft 111, and is subjected to an urging force in the direction B by an urging spring 114. A roller unit 101 is supported by engaging an end portion 212a of the slide shaft 212 with a recessed portion 104c of a feed roller 104. Further, the slide shaft 212 includes a rack portion 212b that engages with a gear (large gear) 210b having a large number of teeth of the stepped gear 210.

Next, the operation of the interlocking device E2 is described. First, the operation for drawing out a roller unit 101 is described.

Figure 16A:
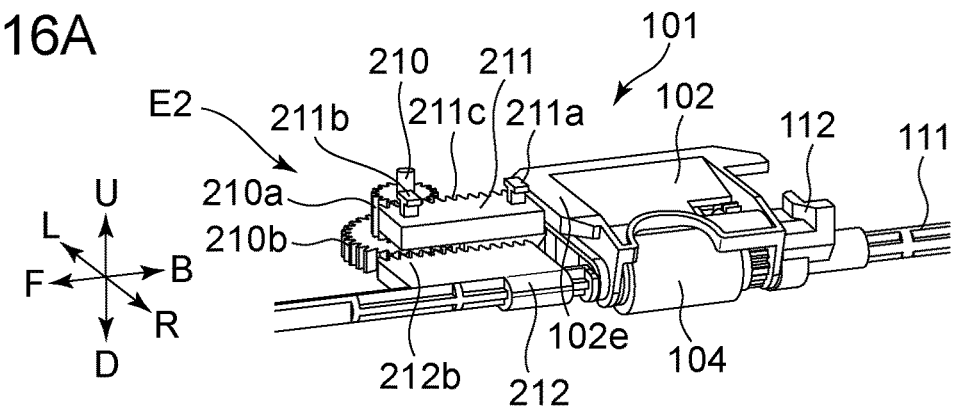
FIGS. 16A to 16D are perspective views of an operation of an interlocking device according to a second embodiment, with FIG. 16A showing an installation position of a feeding roller, FIG. 16B showing a position of abutment of a roller unit on a slide member, FIG. 16C showing a position where a slide shaft starts to separate from a feeding roller unit, and FIG. 16D showing a position where the feeding roller unit is capable of being drawn out.
Figure 16B:
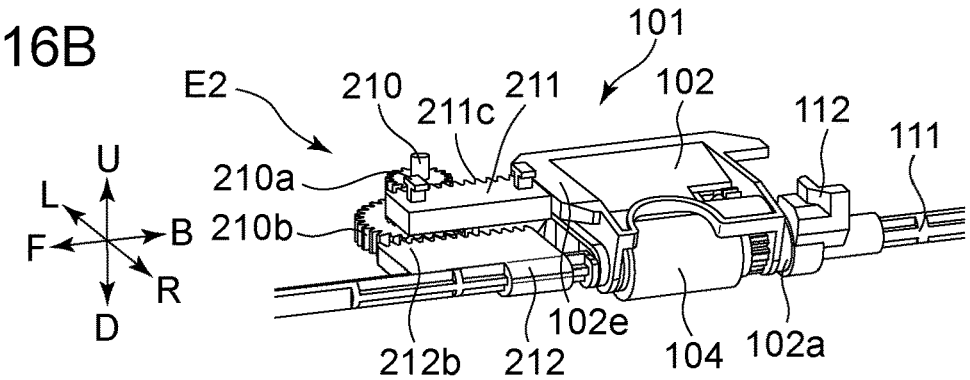

The roller unit 101 is operated and moved in the direction F from an installation position of the roller unit 101 in FIG. 16A. The roller unit 101 moves in the direction F together with the slide shaft 212 against the urging force in the direction B of the urging spring 114, and is set in a state shown in FIG. 16B in which the slide member 211 and a projection 102e of a roller holder 102 abut on each other. In the state in FIG. 16A, the slide member 211 and the projection 102e of the roller holder 102 are separated from each other.

After the slide member 211 and the projection 102e of the roller holder 102 have abutted on each other, the roller unit 101 moves together with the slide member 211 in the direction F. In this case, due to the gear ratio between the large gear 210b and the small gear 210a of the stepped gear 210, the slide shaft 212 moves by an amount that is larger than the moving amount of the roller unit 101 in the direction F.

Figure 16C:
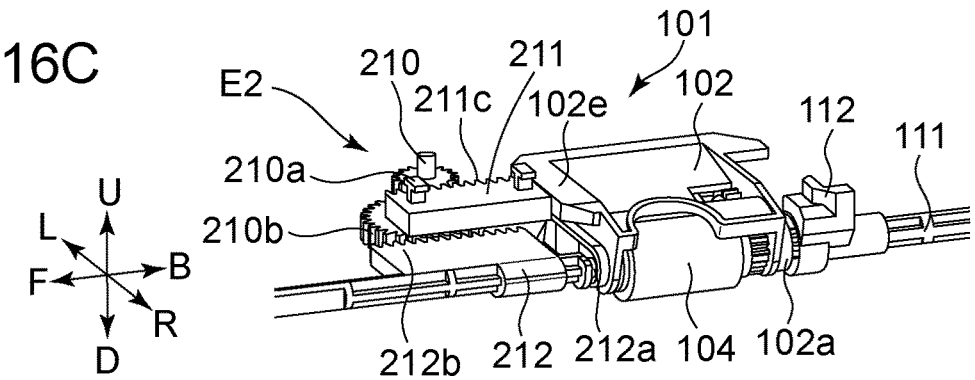
Figure 16D:
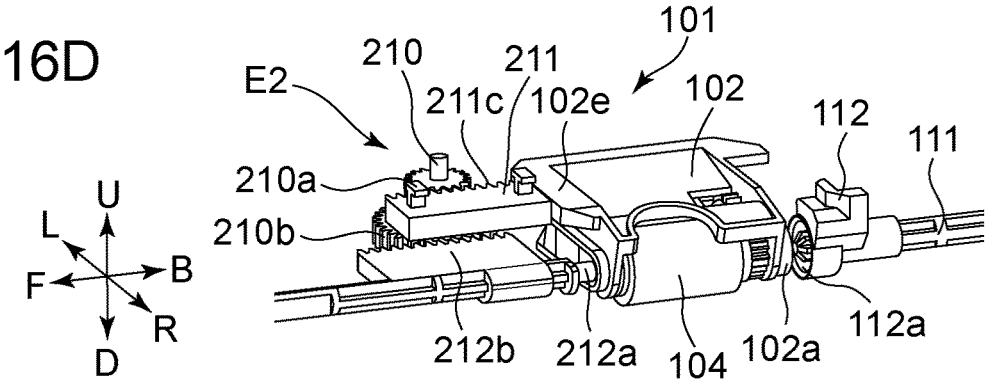

Therefore, as shown in FIG. 16C, the end portion 212a of the slide shaft gradually starts to separate from the recessed portion 104c of the feed roller. Finally, when a projection 102a of the roller holder separates from a recessed portion 112a of a bearing, and the end portion 212a of the slide shaft and the recessed portion 104c of the feed roller separate from each other in the state shown in FIG. 16D, the roller unit 101 can be drawn out in the direction R.

The gear ratio between the large gear 210b and the small gear 210a is set such that the moving amount of the slide shaft 212 is larger than the moving amount of the roller unit 101 in the direction F to separate the projection 102a of the roller holder from the recessed portion 112a of the bearing. As described with reference to FIG. 13 in the first embodiment, the projection 102a of the roller holder and the recessed portion 112a of the bearing need not be completely separated from each other.

The mounting of the roller unit 101 onto the feeding unit 100 is the same as that in the first embodiment, and is thus not described.

As described above, when the roller unit 101 has been operated and moved in the direction F from the installation position, the moving amount of the slide shaft 212 is larger than the moving amount of the roller unit 101. Therefore, when the roller unit 101 has separated from the driving shaft 111, the slide shaft 212 is also settable so as to separate from the roller unit 101.

Consequently, after the roller unit 101 has been moved in the direction F, the roller unit 101 can be removed in the direction R, and the number of steps for replacing the roller unit 101 is reduced, so that usability can be increased.

Third Embodiment

Figure 17A:
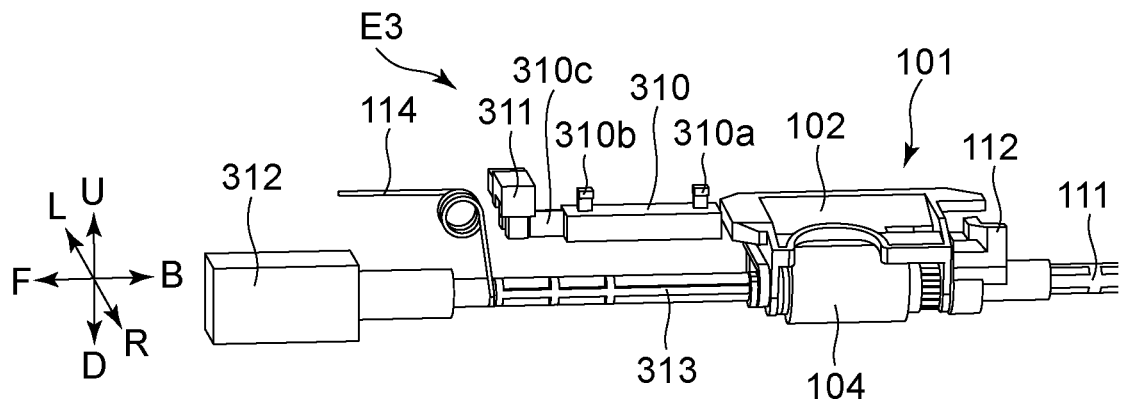
FIGS. 17A to 17C are perspective views of an operation of an interlocking device according to a third embodiment, with FIG. 17A showing an installation position of a feeding roller, FIG. 17B showing a position where a photo-interrupter detects a slide member, and FIG. 17C showing a position where a roller unit is capable of being drawn out.
Figure 17B:
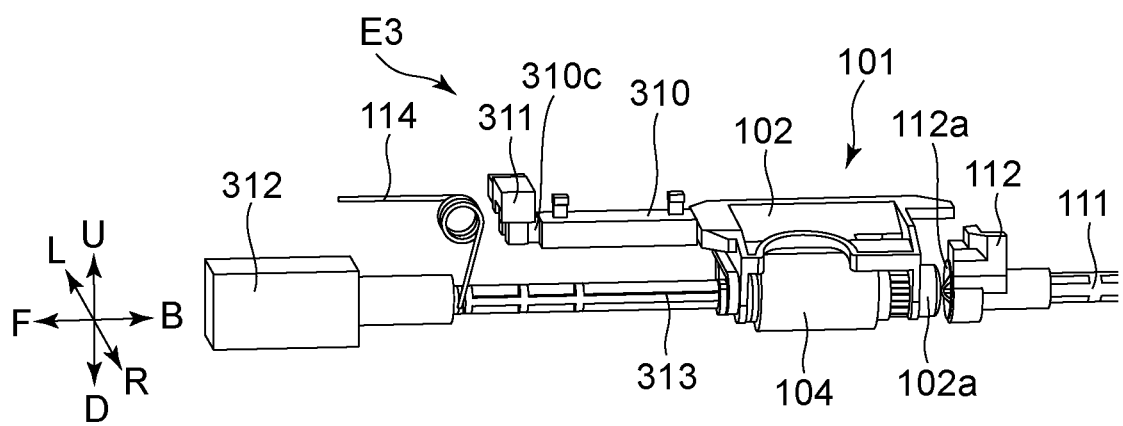
Figure 17C:
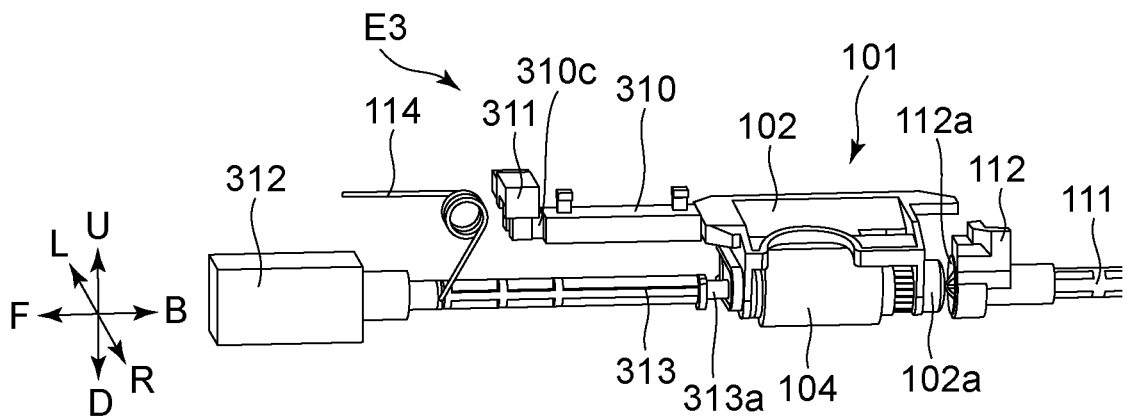

Next, a third embodiment is described with reference to FIGS. 17A to 17C. FIGS. 17A to 17C are perspective views of an operation of an interlocking device E3 according to the third embodiment. In the embodiment, although the interlocking device E3 differs from the structure in the first embodiment in including a detecting portion that detects movement of a roller unit 101 in an axial direction and a solenoid (operating portion) that moves a slide shaft, the other structures thereof are the same. Therefore, such other structures are given the same reference numerals, and are not described in detail.

As shown in FIGS. 17A to 17C, at the interlocking device E3 of the embodiment, hook portions 310a and 310b are held by a feeding frame 110 such that a slide member 310 is movable in the front-back direction, and the slide member 310 is urged in the direction B by an urging unit (not shown). A photo-interrupter 311 is fixed to the feeding frame 110, so that it is possible to detect the position of the slide member due to a change in transmission/shielding of light caused by a light-shielding portion 310c provided at the slide member. Further, a solenoid 312 is mounted on a slide shall 313 on a side opposite to a feed roller 104, so that it is possible to move the slide shaft 313 against an urging spring 114 when the solenoid 312 operates.

Next, the operation of the interlocking device E3 is described. When the roller unit 101 is operated and moved in the direction F from an installation position in FIG. 17A, first, the roller unit 101 moves in the direction F together with the slide shaft 313 against an urging force in the direction B of the urging spring 114. As a result, the slide member 310 and a roller holder 102 abut on each other. Thereafter, the roller unit 101 is integrated with the slide shaft 313 and the slide member 310, and the photointerrupter 311 moves to a location where it detects the light-shielding portion 310c of the slide member. When the photointerrupter 311 detects the light-shielding portion 310c of the slide member, the solenoid 312 operates and the slide shaft 313 moves in the direction F against the urging spring 114. Finally, a projection 102a of the roller holder separates from a recessed portion 112a of a bearing, and an end portion 313a of the slide shaft separates from a recessed portion 104c of the feed roller in the state shown in FIG. 17C, so that the roller unit 101 can be drawn out in the direction R.

As described above, when the roller unit 101 has been operated and moved in the direction F from the installation position, the solenoid 312 operates, and the moving amount of the slide shaft 313 is larger than the moving amount of the roller unit 101, so that the slide shaft 313 and the roller unit 101 can separate from each other. Therefore, after the roller unit 101 has been moved in the direction F, the roller unit 101 can be removed in the direction R, and the number of steps for replacing the roller unit 101 is reduced, so that usability can be increased.

According to the present disclosure, it is possible to provide a sheet conveying device and an image forming apparatus in which usability is further increased by an interlocking device that moves the movable shaft in accordance with the movement of a rotating body unit in the axial direction of rotating bodies.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2017-183520 filed Sep. 25, 2017, and Japanese Patent Application No. 2017-187126 filed Sep. 27, 2017, which are hereby incorporated by reference herein in their entirety.

What is claimed is:

1. A sheet conveying device to convey a sheet, the sheet conveying device comprising:
   an installation portion;
   a supporting shaft;
   a rotating unit configured to be removable from the installation portion and having a first end side, a second end side, a holding member, and a rotating body held by the holding member, wherein the rotating body is configured to convey the sheet by contacting the sheet and rotating, and wherein the rotating unit is supported by the supporting shaft at the first end side of the rotating unit in an axial direction of the rotating body;
   a movable shaft configured to be movable in the axial direction of the rotating body, wherein the movable shaft supports the second end side of the rotating unit in the axial direction of the rotating body; and
   an interlocking device configured to move the movable shaft in accordance with movement of the rotating unit in the axial direction of the rotating body,
   wherein, in a case where the rotating unit is to be moved at a moving amount towards a side in which the rotating unit separates from the supporting shaft as part of removing the rotating unit from the installation portion, the interlocking device moves the movable shaft in the axial direction at a moving amount that is larger than the moving amount of the rotating unit in the axial direction.

2. The sheet conveying device according to claim 1, wherein the rotating body is a conveying roller disposed coaxially with the supporting shaft and configured to convey the sheet.

3. The sheet conveying device according to claim 2, further comprising a driving source configured to drive the supporting shaft,
wherein, with the rotating unit rotatably supported by the supporting shaft, the rotating body rotates due to transmission of power from the driving source to the rotating body.

4. The sheet conveying device according to claim 3, further comprising an urging member configured to urge the movable shaft towards the rotating unit.

5. The sheet conveying device according to claim 4, wherein the interlocking device includes a lever member configured to rotate around a shaft portion as a fulcrum and to move the movable shaft by rotating the lever member.

6. The sheet conveying device according to claim 5, wherein the rotating unit includes an abutment portion that abuts on an abutting portion of the lever member, and
wherein the lever member moves the movable shaft due to the abutting portion of the lever member being pushed by the abutment portion of the rotating unit.

7. The sheet conveying device according to claim 6, wherein the movable shaft includes an engagement portion, and
wherein the lever member includes an engaging portion configured to engage with the engagement portion of the movable shaft.

8. The sheet conveying device according to claim 7, wherein a distance from the shaft portion to the engaging portion of the lever member is larger than a distance from the shaft portion to the abutment portion of the rotating unit.

9. The sheet conveying device according to claim 7, wherein, after the lever member has moved the movable shaft, the rotating unit is configured to be removed from the installation portion while the abutment portion of the rotating unit slides on the abutting portion of the lever member.

10. The sheet conveying device according to claim 7, wherein, in a state in which the rotating unit is installed on the installation portion, the lever member is positioned such that the abutting portion of the lever member does not abut on the abutment portion of the rotating unit.

11. The sheet conveying device according to claim 1, wherein the rotating unit is mountable on the installation portion, and
wherein, in a case where the rotating unit is to be mounted on the installation portion, the interlocking device moves the movable shaft by abutting on the rotating unit.

12. The sheet conveying device according to claim 11, further comprising a guide portion configured to allow the rotating unit to be removed,
wherein the rotating unit includes an inclined surface portion to move the movable shaft in the axial direction when the rotating unit is to be mounted on the installation portion along the guide portion.

13. The sheet conveying device according to claim 1, wherein the interlocking device includes at least two of the following:

a stepped gear composed of a first gear and a second gear having a number of teeth that is less than a number of teeth of the first gear,
a slide member that abuts on the rotating unit and is configured to be supported to be movable in the axial direction,
a first rack portion provided at the slide member and configured to engage with the second gear having the number of teeth that is less than the number of teeth of the first gear, and
a second rack portion provided at the movable shaft and configured to engage with the first gear having the number of teeth that is greater than the number of teeth of the second gear.

14. The sheet conveying device according to claim 1, further comprising:
a detecting portion configured to detect movement of the rotating unit in the axial direction; and
an operating portion configured to move the movable shaft in the axial direction,
wherein, in a case where the detecting portion has detected movement of the rotating unit, the operating portion moves the movable shaft.

15. A sheet conveying device to convey a sheet, the sheet conveying device comprising:
a supporting shaft;
a rotating unit configured to be removable from the sheet conveying device and having a pushing portion, a holding member, and a rotating body held by the holding member, wherein the rotating body includes a first end side and a second end side, is supported by the supporting shaft at the first end side in an axial direction of the rotating body, and is configured to convey the sheet by contacting the sheet and rotating;
a movable member configured to be movable in the axial direction to a first position and a second position, wherein the movable member engages at the first position with the second end side of the rotating body that conveys the sheet, and the movable member is more separated at the second position from the supporting shaft than at the first position; and
a rotating member having a push portion and a contact portion and configured to move the movable member in accordance with movement of the rotating unit,
wherein, in a case where the pushing portion of the rotating unit pushes the push portion of the rotating member, the rotating member rotates around a rotation shaft portion and contacts and moves the movable member, and
wherein a distance between the rotation shaft portion and the push portion of the rotating member is smaller than a distance between the rotation shaft portion and the contact portion of the rotating member.

16. An image forming apparatus comprising:
an installation portion;
a supporting shaft;
a rotating unit configured to be removable from the installation portion and having a first end side, a second end side, a holding member, and a rotating body held by the holding member, wherein the rotating body is configured to convey a sheet by contacting the sheet and rotating, and wherein the rotating unit is supported by the supporting shaft at the first end side of the rotating unit in an axial direction of the rotating body;
a movable member configured to be movable in the axial direction of the rotating body, wherein the movable member supports the second end side of the rotating unit in the axial direction of the rotating body;

an image forming section configured to form an image on the sheet conveyed by the rotating body; and an interlocking device configured to move the movable member in accordance with movement of the rotating unit in the axial direction of the rotating body, wherein, in a case where the rotating unit is to be moved at a moving amount towards a side in which the rotating unit separates from the supporting shaft as part of removing the rotating unit from the installation portion, the interlocking device moves the movable member in the axial direction at a moving amount that is larger than the moving amount of the rotating unit in the axial direction.

17. The image forming apparatus according to claim 16, wherein the rotating body is a conveying roller disposed coaxially with the supporting shaft and configured to convey the sheet.

18. The image forming apparatus according to claim 16, further comprising a driving source configured to drive the supporting shaft, wherein, with the rotating unit rotatably supported by the supporting shaft, the rotating body rotates due to transmission of power from the driving source to the rotating body.

19. The image forming apparatus according to claim 16, wherein the interlocking device includes a lever member configured to rotate around a shaft portion as a fulcrum and to move the movable shaft by rotating the lever member.

20. The image forming apparatus according to claim 19, wherein the rotating unit includes an abutment portion that abuts on an abutting portion of the lever member, and wherein the lever member moves the movable shaft due to the abutting portion of the lever member being pushed by the abutment portion of the rotating unit.

21. The image forming apparatus according to claim 19, wherein the movable shaft includes an engagement portion, wherein the lever member includes an engaging portion configured to engage with the engagement portion of the movable shaft, and wherein a distance from the shaft portion to the engaging portion of the lever member is larger than a distance from the shaft portion to the abutment portion of the rotating unit.

* * * * *